US008072675B2

(12) United States Patent
Lin et al.

(10) Patent No.: US 8,072,675 B2
(45) Date of Patent: Dec. 6, 2011

(54) COLOR DISPLAY DEVICES

(75) Inventors: Craig Lin, San Jose, CA (US); Robert A. Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 112 days.

(21) Appl. No.: 12/432,519

(22) Filed: Apr. 29, 2009

(65) Prior Publication Data

US 2009/0273827 A1 Nov. 5, 2009

Related U.S. Application Data

(60) Provisional application No. 61/049,735, filed on May 1, 2008.

(51) Int. Cl.
*G02B 26/00* (2006.01)

(52) U.S. Cl. ........................................ 359/296; 345/107

(58) Field of Classification Search .................. 359/296; 345/107

See application file for complete search history.

(56) References Cited

U.S. PATENT DOCUMENTS

| | | | |
|---|---|---|---|
| 3,892,568 | A | 7/1975 | Ota |
| 4,298,448 | A | 11/1981 | Muller et al. |
| 5,378,574 | A | 1/1995 | Winnik et al. |
| 5,980,719 | A | 11/1999 | Cherukuri et al. |
| 6,198,809 | B1 | 3/2001 | Disanto et al. |
| 6,337,761 | B1 | 1/2002 | Rogers et al. |
| 6,373,461 | B1 | 4/2002 | Hasegawa et al. |
| 6,486,866 | B1 | 11/2002 | Kuwahara et al. |
| 6,538,801 | B2 | 3/2003 | Jacobson et al. |
| 6,693,620 | B1 | 2/2004 | Herb et al. |
| 6,704,133 | B2 | 3/2004 | Gates et al. |
| 6,724,521 | B2 | 4/2004 | Nakao et al. |
| 6,729,718 | B2 | 5/2004 | Goto et al. |
| 6,864,875 | B2 | 3/2005 | Drzaic et al. |
| 6,930,818 | B1 | 8/2005 | Liang et al. |
| 7,009,756 | B2 | 3/2006 | Kishi et al. |
| 7,038,655 | B2 | 5/2006 | Herb et al. |
| 7,038,670 | B2 | 5/2006 | Liang et al. |
| 7,046,228 | B2 | 5/2006 | Liang et al. |
| 7,050,218 | B2 | 5/2006 | Kanbe |
| 7,075,502 | B1 | 7/2006 | Drzaic et al. |
| 7,283,199 | B2 | 10/2007 | Aichi et al. |
| 7,365,732 | B2 | 4/2008 | Matsuda et al. |
| 7,417,787 | B2 | 8/2008 | Chopra et al. |
| 7,545,557 | B2 | 6/2009 | Iftime et al. |
| 7,548,291 | B2 | 6/2009 | Lee et al. |
| 7,830,592 | B1 | 11/2010 | Sprague et al. |
| 2002/0033792 | A1 | 3/2002 | Inoue |
| 2002/0171620 | A1 | 11/2002 | Gordon et al. |

(Continued)

FOREIGN PATENT DOCUMENTS

| | | |
|---|---|---|
| EP | 1 089 118 | 4/2001 |

(Continued)

OTHER PUBLICATIONS

U.S. Appl. No. 12/323,315, filed Nov. 25, 2008, Sprague et al.

(Continued)

*Primary Examiner* — Evelyn A. Lester
(74) *Attorney, Agent, or Firm* — Perkins Coie LLP

(57) ABSTRACT

The present invention is directed to color display devices in which each display cell is capable of displaying three color states. The display fluid filled in the display cells comprises two types of pigment particles. The color display device may further comprise a brightness enhancement structure on its viewing side.

23 Claims, 37 Drawing Sheets

U.S. PATENT DOCUMENTS

| | | | |
|---|---|---|---|
| 2003/0002132 | A1 | 1/2003 | Foucher et al. |
| 2003/0095094 | A1 | 5/2003 | Goden |
| 2003/0107631 | A1 | 6/2003 | Goto et al. |
| 2003/0132908 | A1 | 7/2003 | Herb et al. |
| 2004/0051935 | A1 | 3/2004 | Katase |
| 2004/0113884 | A1 | 6/2004 | Albert et al. |
| 2004/0136048 | A1 | 7/2004 | Arango et al. |
| 2004/0263947 | A1 | 12/2004 | Drzaic et al. |
| 2005/0151709 | A1 | 7/2005 | Jacobson et al. |
| 2005/0190431 | A1 | 9/2005 | Matsuda |
| 2009/0034054 | A1 | 2/2009 | Ikegami et al. |
| 2009/0213452 | A1 | 8/2009 | Lin et al. |
| 2009/0231245 | A1 | 9/2009 | Lin |
| 2009/0251763 | A1 | 10/2009 | Sprague et al. |
| 2010/0053728 | A1 | 3/2010 | Lin et al. |
| 2010/0165005 | A1 | 7/2010 | Sprague |
| 2010/0165448 | A1 | 7/2010 | Sprague |

FOREIGN PATENT DOCUMENTS

| | | |
|---|---|---|
| WO | WO 99/53373 | 10/1999 |
| WO | WO 01/67170 | 9/2001 |
| WO | WO 03/016993 | 2/2003 |
| WO | WO 2007/013682 | 2/2007 |
| WO | WO 2008/122927 | 10/2008 |
| WO | WO 2009/105385 | 8/2009 |
| WO | WO 2009/124142 | 10/2009 |
| WO | WO 2010/027810 | 3/2010 |

OTHER PUBLICATIONS

International Search Report for PCT/US09/42114, mailed Jun. 30, 2009.

U.S. Appl. No. 13/038,255, filed Mar. 1, 2010, Sprague.

U.S. Appl. No. 13/092,052, filed Apr. 21, 2011, Sprague et al.

COLOR DISPLAY DEVICES

This application claims priority to U.S. Provisional Application No. 61/049,735, filed May 1, 2008; the content of which is incorporated herein by reference in its entirety.

FIELD OF THE INVENTION

The present invention is directed to display devices in which each display cell is capable of displaying three color states. The display fluid filled in the display cells comprises two types of pigment particles. The display device may further comprise blocking layers and a brightness enhancement structure.

BACKGROUND OF THE INVENTION

U.S. Pat. No. 7,046,228 discloses an electrophoretic display device having a dual switching mode which allows the charged pigment particles in a display cell to move in either the vertical (up/down) direction or the planar (left/right) direction.

In such a display device, each of the display cells is sandwiched between two layers, one of which comprises a transparent top electrode, whereas the other layer comprises a bottom electrode and at least one in-plane electrode. Typically, the display cells are filled with a clear, but colored dielectric solvent or solvent mixture with charged white pigment particles dispersed therein. The background color of the display cells is preferably black. When the charged pigment particles are driven to be at or near the transparent top electrode, the color of the particles is seen, from the top viewing side. When the charged pigment particles are driven to be at or near the bottom electrode, the color of the solvent is seen, from the top viewing side. When the charged pigment particles are driven to be at or near the in-plane electrode(s), the color of the display cell background is seen, from the top viewing side. Accordingly, each of the display cells is capable of displaying three color states, i.e., the color of the charged pigment particles, the color of the dielectric solvent or solvent mixture or the background color of the display cell.

The dual mode electrophoretic display, according to the patent, may be driven by an active matrix system or by a passive matrix system.

Alternatively, a color display may be achieved by a red/green/blue (RGB) system, in which each pixel is broken down into three or four sub-pixels and each sub-pixel has a red filter, blue filter, green filter or no filter over a black and white reflective medium. By selectively turning sub-pixels on or off, a full color spectrum may be achieved.

SUMMARY OF THE INVENTION

The present invention is directed to alternative designs of color display devices. The color display device of the present invention has many advantages. For example, it has a simplified structure. In addition, it provides good quality black and white color states with full color capability. The addressing procedure for this type of color display devices is also simpler and more cost efficient. Furthermore, no contrast loss is expected for the black and white states, an important characteristic for e-books. With these advantages, the color display device of the present invention is far better than a display device utilizing color filters, particularly in terms of reflectance and white color qualities.

The display device of the present invention comprises a plurality of display cells, wherein each of said display cells is (a) sandwiched between a first layer comprising a common electrode and a second layer comprising a plurality of driving electrodes, wherein at least one of the driving electrodes is the designated electrode and the remaining driving electrodes are non-designated electrodes, (b) filled with an electrophoretic fluid comprising a group of white particles and a group of black particles dispersed in a solvent or solvent mixture, and (c) capable of displaying three color states.

The two groups of particles carry opposite charge polarities or carry the same charge polarity but having different electrophoretic mobilities.

The pigment particles are driven to the designated electrode(s) all at once or in steps.

The driving electrodes may be a grid of at least 2×2.

In addition, the total area of the non-designated electrodes is preferably at least three times, more preferably at least six times and most preferably at least eight times, the total area of the designated electrode(s).

The first layer comprising a common electrode may be on the viewing side. Alternatively, the second layer comprising multiple driving electrodes may be on the viewing side. If the second layer is on the viewing side, the designated electrodes may be non-transparent, e.g., opaque. Alternatively, the designated electrodes are transparent and in this case, blocking layers may be needed.

The display device may further comprise a brightness enhancement structure on its viewing side. The brightness enhancement structure may comprise micro-structures or micro-reflectors. The micro-structures or micro-reflectors may have a top angle of about 5° to about 50°, preferably about 20° to about 40°.

In a first embodiment of the display device, the solvent or solvent mixture is colored, e.g., red, green or blue. The driving electrodes may be un-aligned or aligned with the boundary of the display cell.

In a second embodiment of the display device, the solvent or solvent mixture is clear and colorless and the display device further comprises a colored background layer, e.g., red, green or blue. The colored background layer may be above or below the first or second layer. Alternatively, the first or second layer may serve as the colored background layer.

In this second embodiment, the boundary of the second layer may be un-aligned with the boundary of the fluid area. In this case, at least one designated electrode for the white particles and at least one designated electrode for the black particles are within the boundary of the fluid area. Alternatively, the boundary of the second layer may be aligned with the boundary of the fluid area.

The display device of the second embodiment may further comprise a brightness enhancement structure on its viewing side or blocking layers in positions corresponding to the designated electrodes. The blocking layers may be the black matrix layers.

DETAILED DESCRIPTION OF THE INVENTION

I. Configuration of a Display Device

Figure 1B:
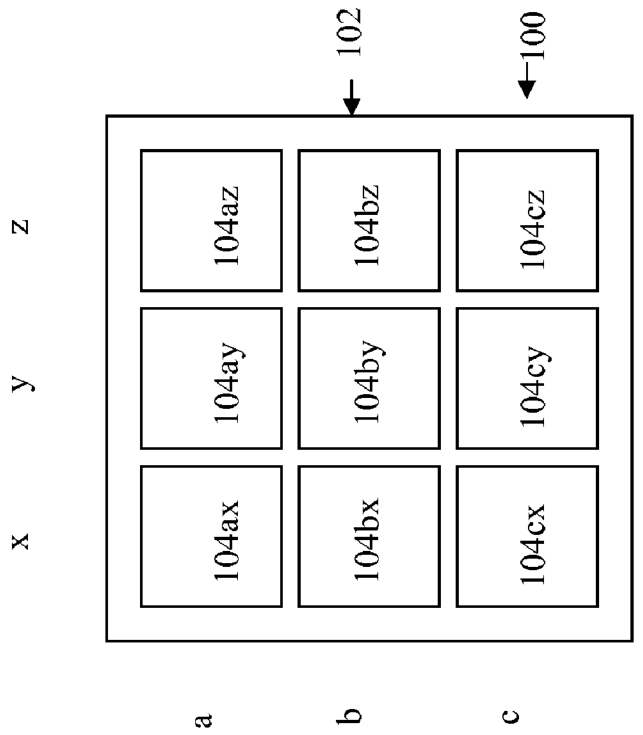
FIGS. 1*b*, 1*c* and 1*d* depict a top view of the layer comprising driving electrodes.
Figure 1A:
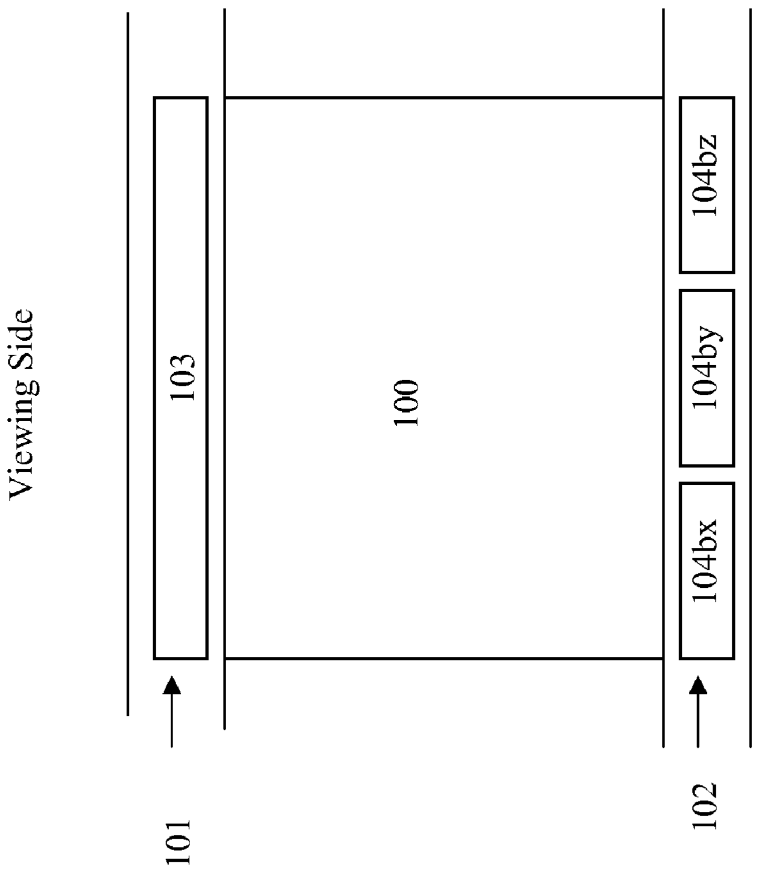
FIG. 1*a* depicts a cross-section view of a display cell of a color display device of the present invention.

FIG. 1*a* depicts a cross-section view of a display cell of a color display device of the present invention. The display cell (100) is sandwiched between a first layer (101) and a second layer (102). The first layer comprises a common electrode (103). The second layer comprises more than one driving electrode (e.g., 104*bx*, 104*by* and 104*bz*).

In one embodiment, each display cell, as shown in FIG. 1*a*, represents a single sub-pixel. In most cases, there will be at least 3 subpixels (red, green and blue) to form a pixel.

FIG. 1*b* depicts the top view of the layer comprising driving electrodes of the display cell of FIG. 1*a*. As shown, the second layer (102) comprises 3×3 driving electrodes, denoted as 104*ax*, 104*ay*, 104*az*, 104*bx*, 104*by*, 104*bz*, 104*cx*, 104*cy* and 104*cz*. While only a 3×3 grid is shown, the second layer may comprise any grid which is at least 2×2. The size of the driving electrodes may vary, depending on the size of the display cell. There is a gap between the driving electrodes. In other words, the driving electrodes are not in contact with each other.

In the context of the present invention, the driving electrodes may be identified as "designated" or "non-designated" electrodes. A "designated" electrode is a driving electrode which is intended for one type of the charged pigment particles to gather when a proper voltage potential is applied. The remaining driving electrodes are non-designated electrodes.

The multiple driving electrodes within a display cell allow the particles to migrate to one or more designated electrodes or to spread over all the driving electrodes.

The 9 driving electrodes in FIG. 1*b* are shown to have the same shape and size. It is understood that the shapes and sizes the driving electrodes in the same display device may vary, as long as they serve the desired functions.

Optionally, there is a background layer (not shown), which may be above the second layer (102) or below the second layer (102). Alternatively, the second layer may serve as a background layer. The background layer may be colored or black. If it is black, it is beneficial for intensifying the black color state.

The common electrode (103) is usually a transparent electrode layer (e.g., ITO), spreading over the entire top of the display device. The driving electrodes (104*s*) may be active matrix electrodes which are described in U.S. Pat. No. 7,046,228, the content of which is incorporated herein by reference in its entirety. It is noted that the scope of the present invention is not limited to the driving electrodes being active matrix electrodes. The scope of the present application encompasses other types of electrode addressing as long as the electrodes serve the desired functions.

It is also shown in FIG. 1*b* that the 9 driving electrodes are aligned with the boundary of the display cell (100). However, for this type of color display, this feature is optional. Details of an un-aligned configuration are given below.

While the first layer (101) is shown in FIG. 1*a* as the viewing side, it is also possible for the second layer (102) to be on the viewing side. This is illustrated as alternative designs discussed below.

The display cells are filled with an electrophoretic fluid which comprises two types of pigment particles dispersed in a solvent or solvent mixture. The two different types of pigment particles may carry charges of opposite polarity.

It is also possible to have two types of pigment particles carrying the same charge polarity but with different electrophoretic mobilities, if the mobility of one pigment is substantially different from that of the other. The mobilities of the pigment particles may arise from different particle sizes, particle charges or particle shapes. Coating or chemical treatment of the surfaces of the pigment particles can also be used to adjust the electrophoretic mobility of the pigment particles.

Figure 1C:
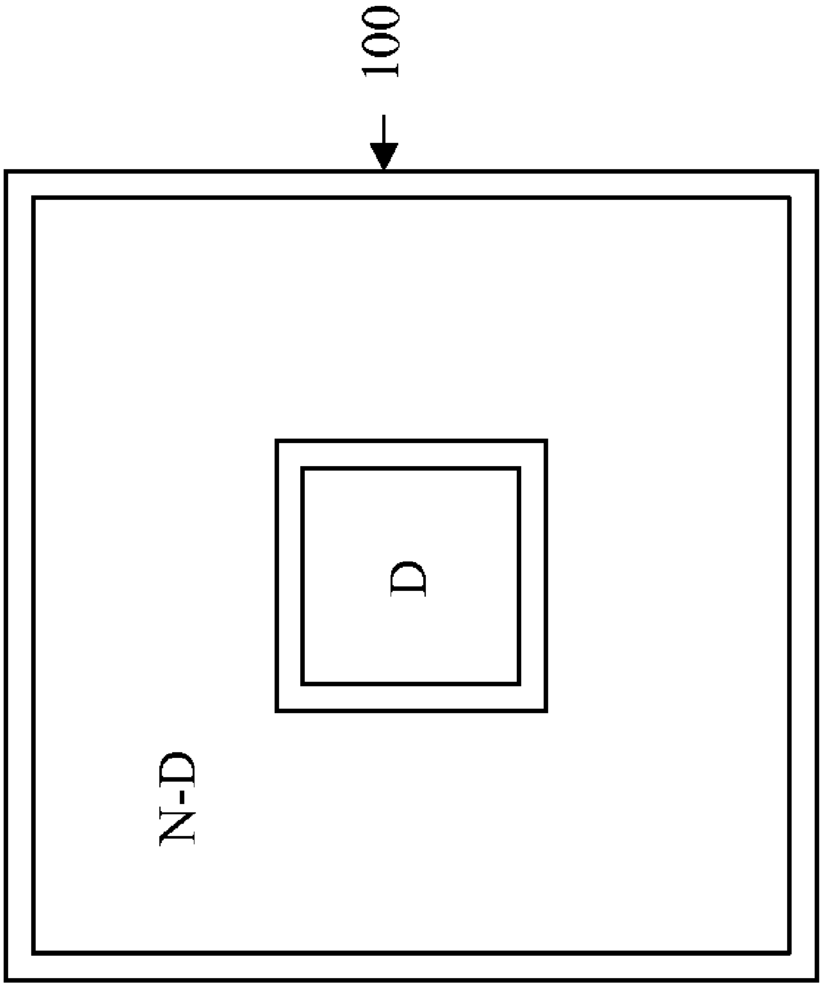

An alternative design of the second layer (102) is shown in FIG. 1*c*. In FIG. 1*c*, the center electrode "D" is the designated electrode whereas the non-designated driving electrode "N-D" surrounds the designated electrode D. This alternative design has the advantage that there are fewer addressing points that are needed, thus reducing the complexity of the electrical circuit design. For this alternative design, the designated electrode(s) and the non-designated electrode(s) must be aligned with the boundary of the display cell.

Figure 1D:
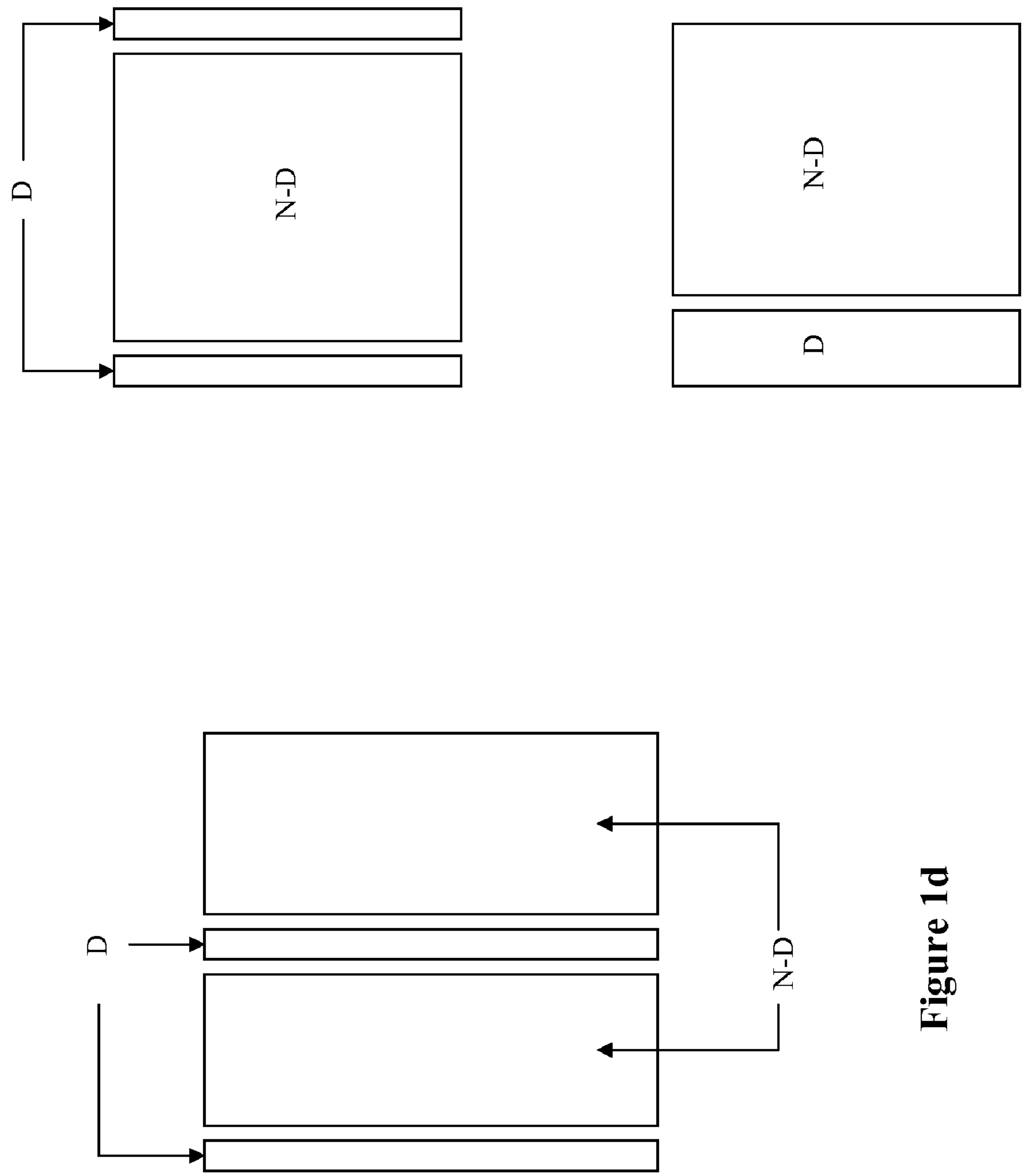

FIG. 1*d* shows other alternative electrode structures to enable the present invention.

It is also noted that there may be different numbers of the designated and non-designated electrodes, and the designated and non-designated electrodes may be of any shapes; but the non-designated electrode(s) must be larger in total area than the designated electrode(s). The total area of the non-designated electrode(s) is preferably at least three times, more preferably at least six times and most preferably at least eight times, the total area of the designated electrodes(s).

Figure 2:
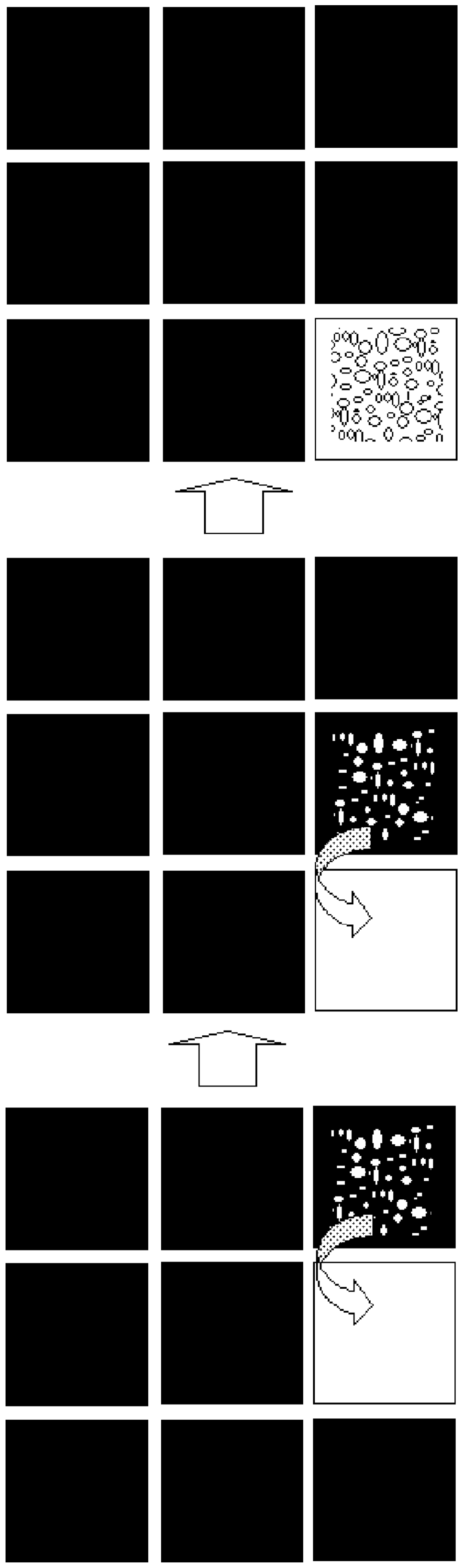
FIG. 2 illustrates how the charged pigment particles may move to the designated electrodes in steps.

In the context of the present invention, the migration of the charged pigment particles to the designated electrode(s) may occur all at once, that is, the voltages of the common and driving electrodes are set at such to cause the charged pigment particles to migrate to be at or near the designated electrode(s) all at once. Alternatively, the migration may take place in steps. As shown in FIG. 2, the voltages of driving electrodes are set at such to cause the charged pigment particles to move from one driving electrode to an adjacent driving electrode one step at a time and eventually to the designated electrode(s). This driving method may prevent the charged pigment particles from being trapped at the center of one large driving electrode even though the large driving electrode has the same polarity as the pigment particles.

Figure 3:
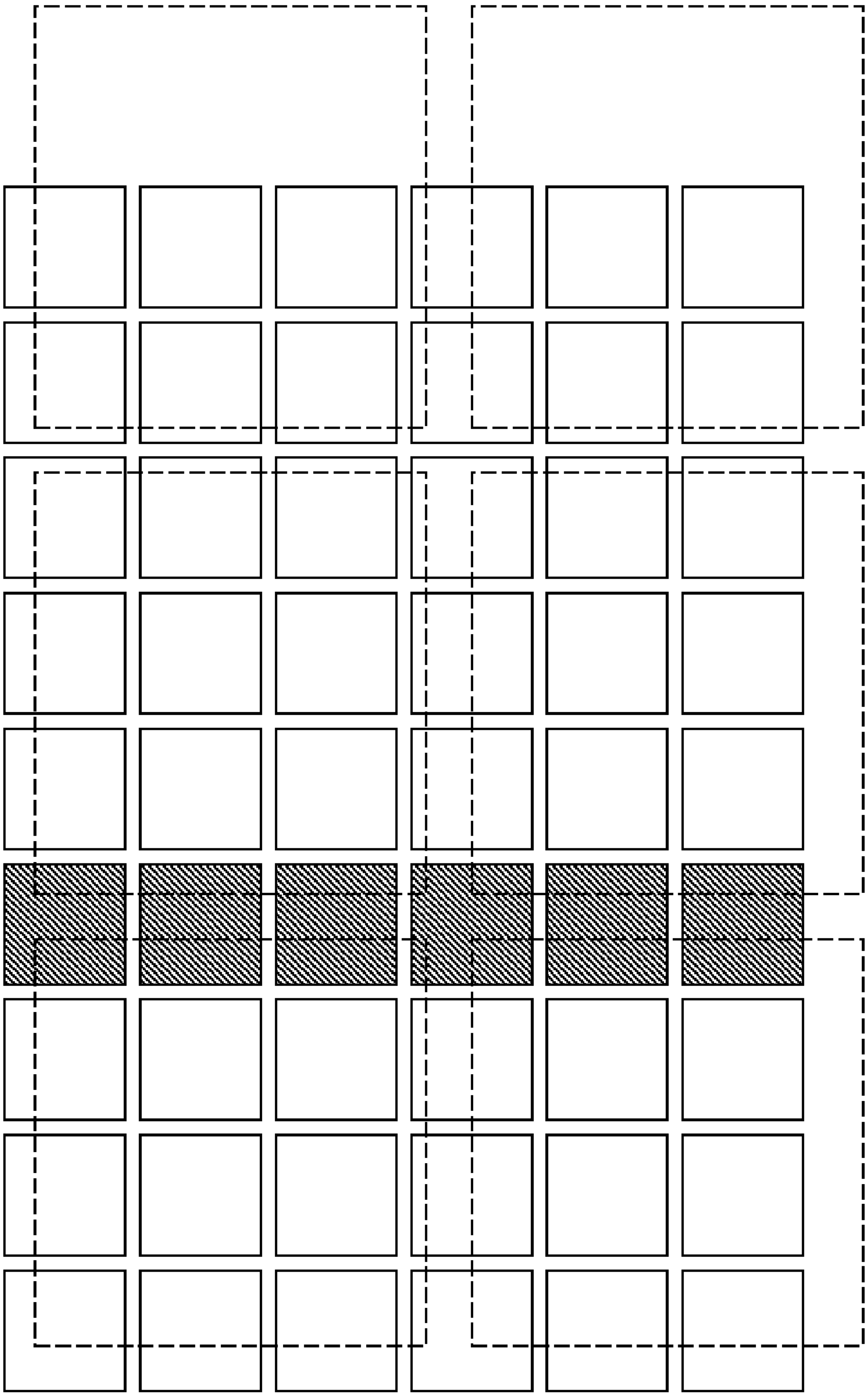
FIG. 3 depicts the driving electrodes not aligned with the boundaries of the display cells.

Another one of the advantages of the color display of the present invention is that the driving electrodes do not have to be aligned with the boundary of the display cell. As shown in FIG. 3, the display cells (represented by the dofted lines) and the driving electrodes (represented by the solid lines) are not aligned. In this case, the charged pigment particles may still be driven to show the desired color states. To accomplish this, a scanning method or similar approaches may be used to first determine which driving electrodes address which display cell. For those driving electrodes (shaded in FIG. 3) at the edges of the display cells may never be used or may be used to drive only partial areas of the driving electrodes. However, in the latter case, cross-talk may occur. As a result, in some cases, it is preferred to have more driving electrodes in a single pixel.

An alternative embodiment of this misalignment feature is discussed in a section below.

The display cells may be microcups, microcapsules, microchannels, other wall-typed micro-containers, or equivalents thereof.

II. The Color Display Device

Figures 1, 4A:
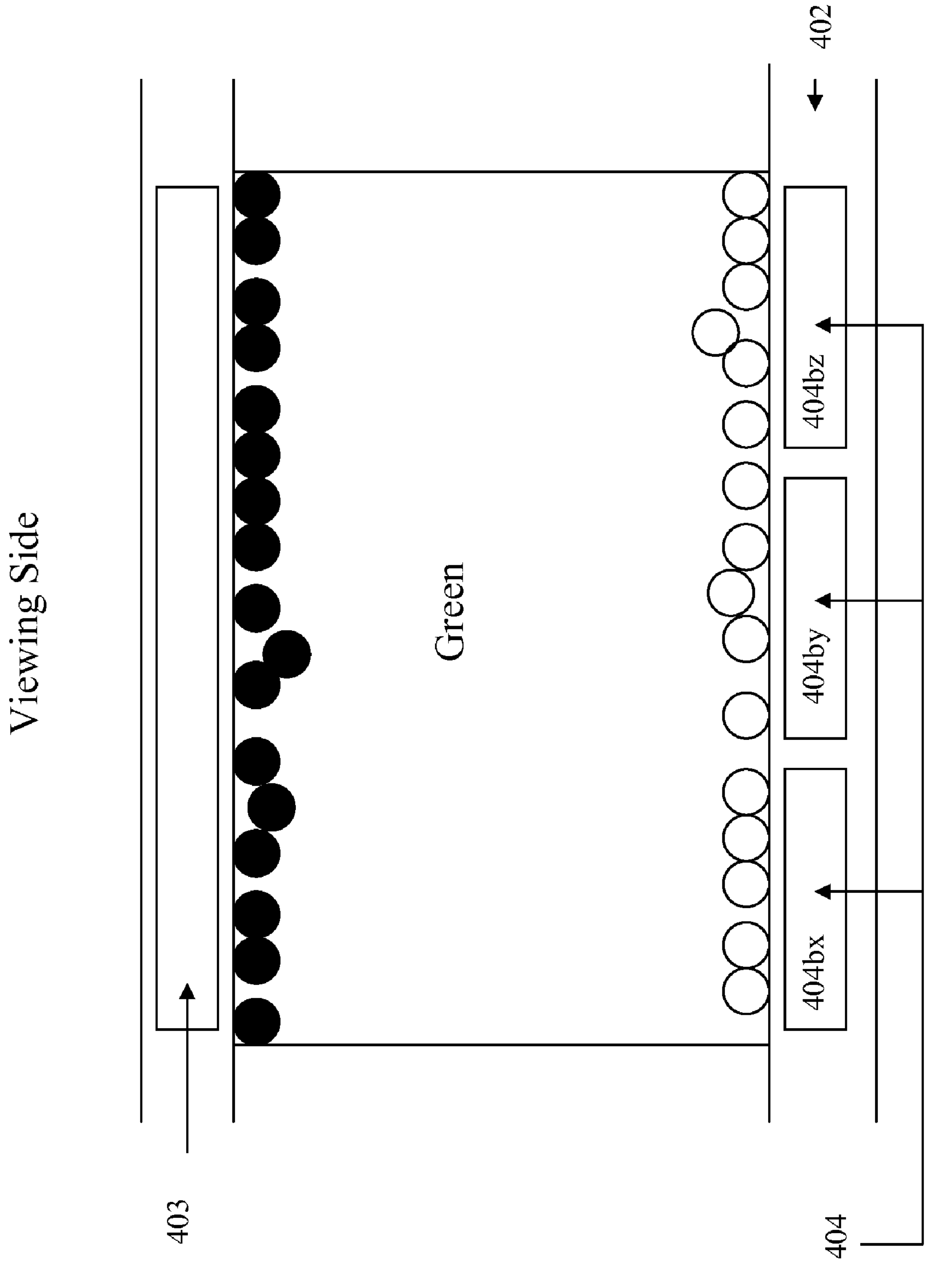
FIGS. 4*a*-4*c* illustrate how three different color states may be displayed.
Figures 2, 4A:
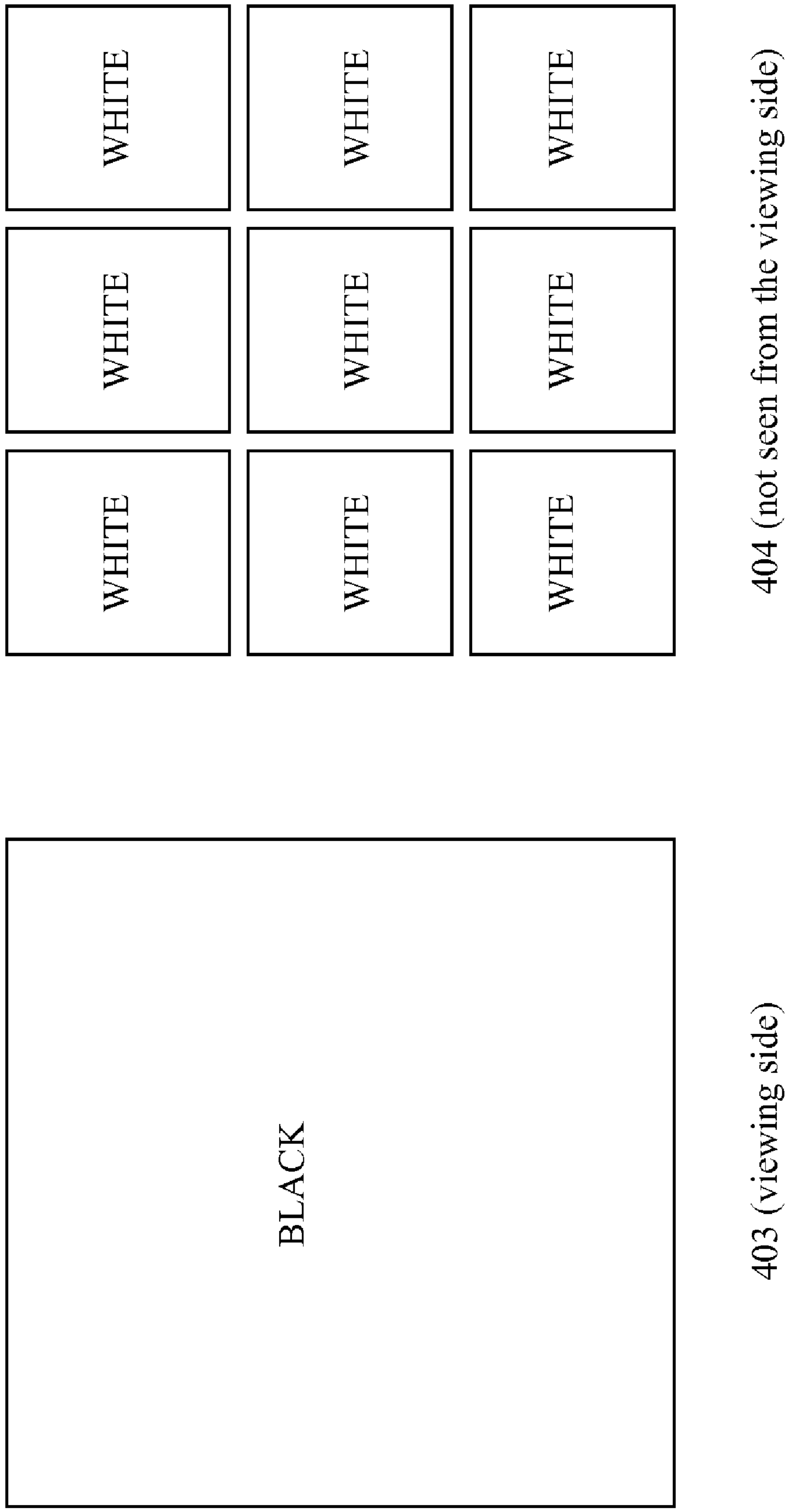
Figures 1, 4B:
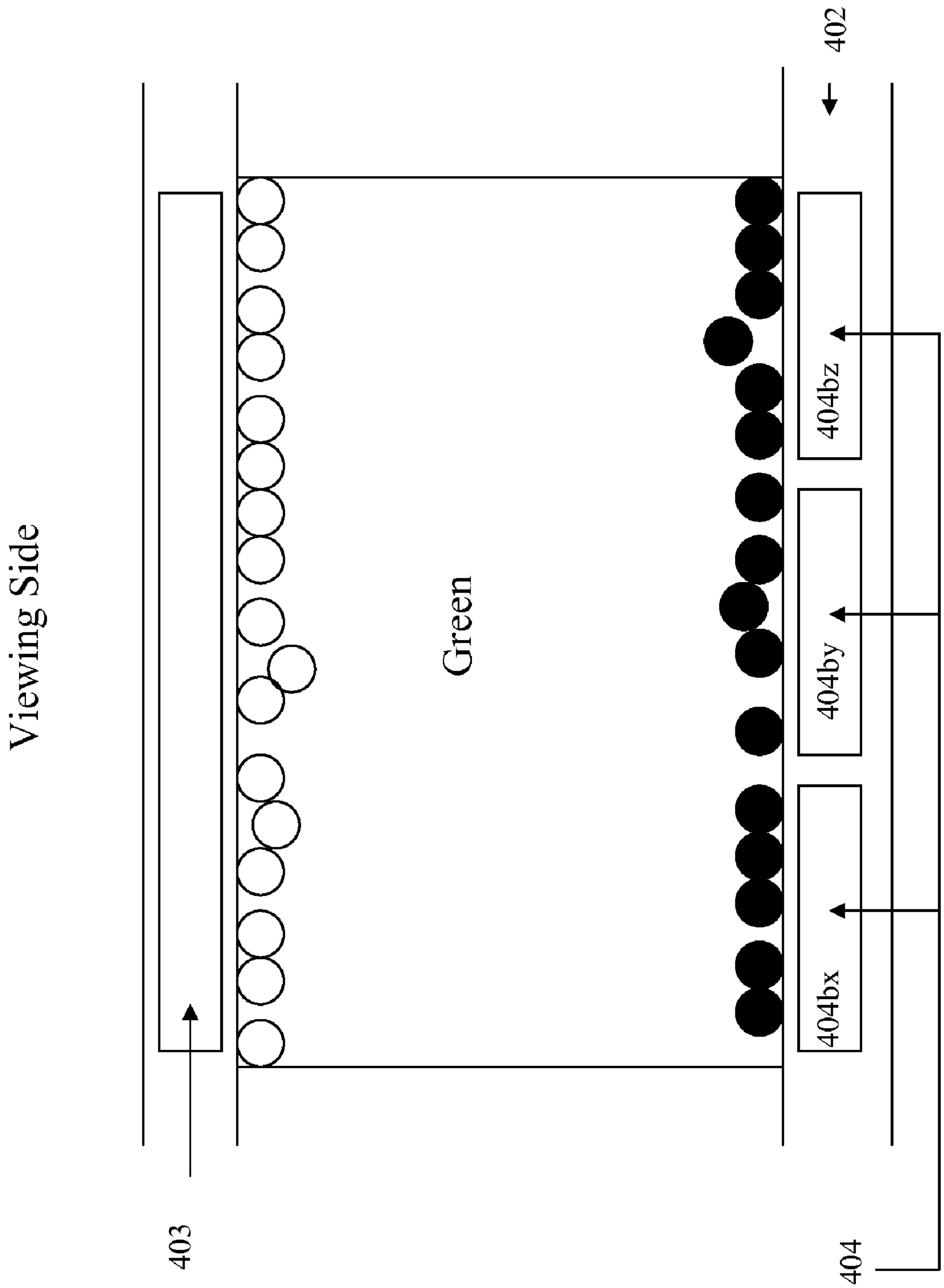
Figures 2, 4B:
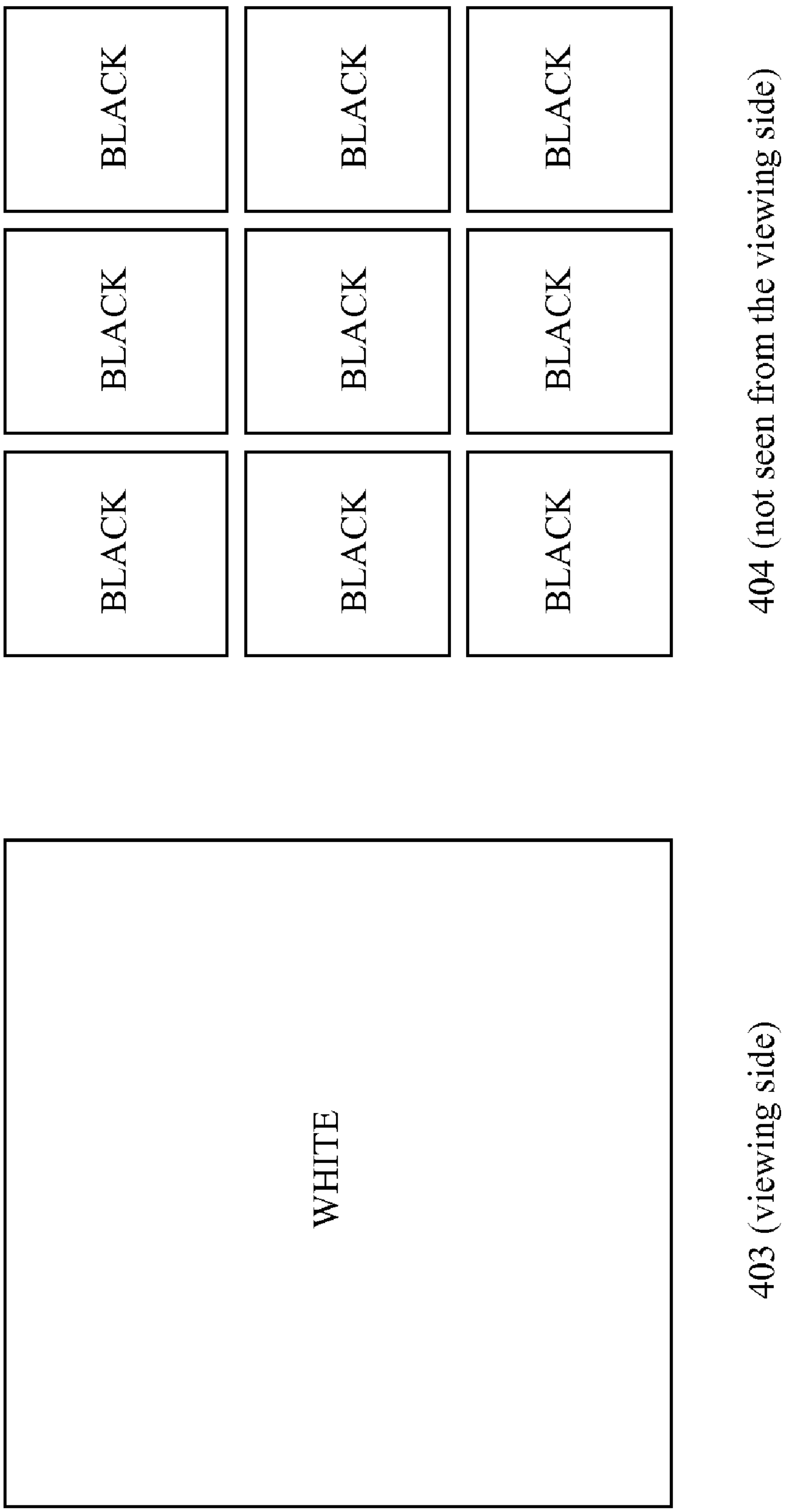
Figures 1, 4C:
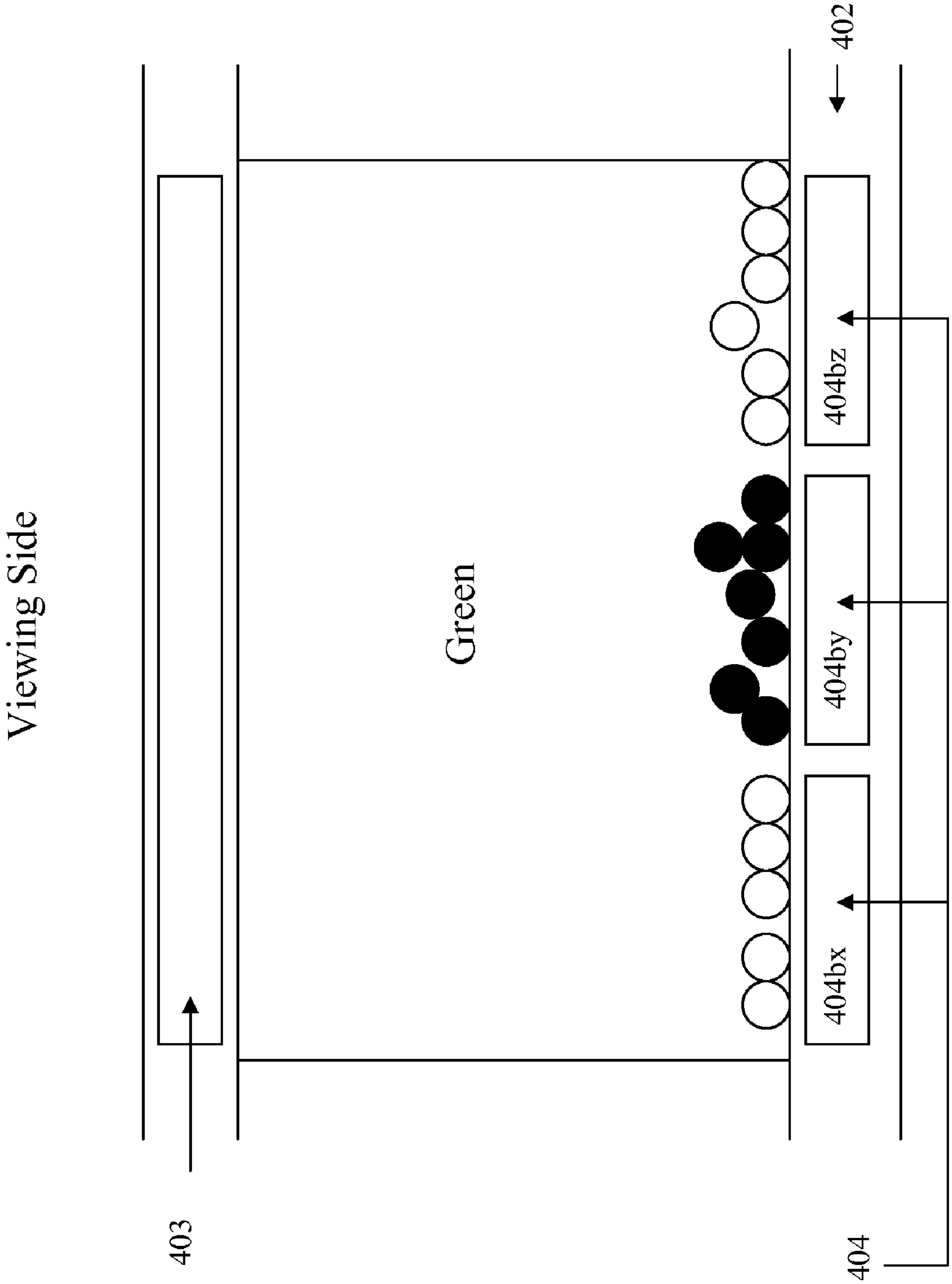
Figures 2, 4C:
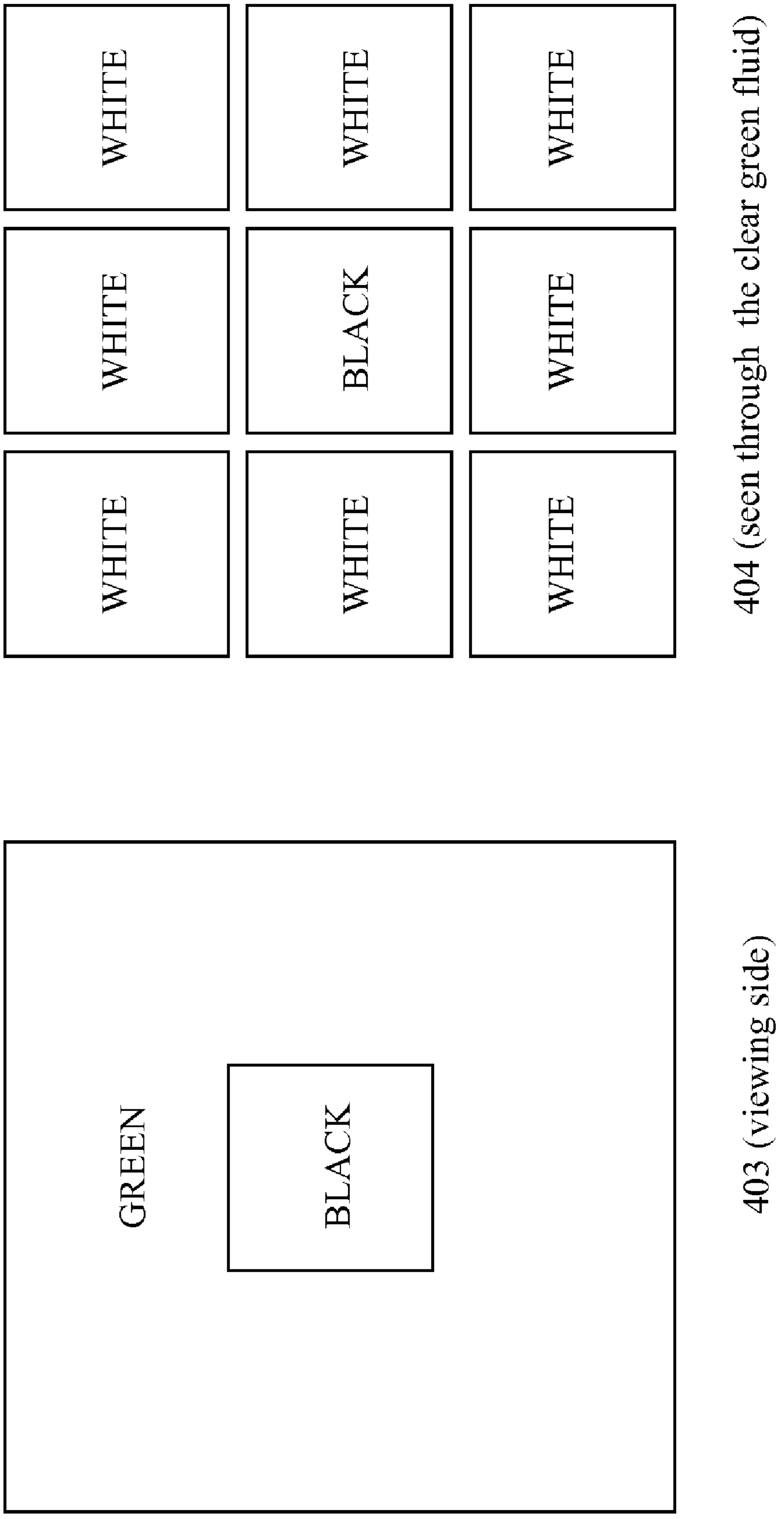

FIGS. 4*a*-4*c* illustrate an example of how different color states may be displayed. There are two types of pigment particles in the electrophoretic fluid filled in the display cell. The two types of pigment particles are of the white and black colors, and they move independently from each other because they carry charges of opposite polarities. It is assumed that the white pigment particles are negatively charged and the black pigment particles are positively charged. It is also assumed that the two types of pigment particles are dispersed in a solvent of green color.

While only three driving electrodes are shown, it is assumed that the driving electrodes on the second layer have a 3×3 grid as shown in FIG. 1*b* and only driving electrode 404*by* is the designated electrode. The common electrode 403 is transparent.

In FIG. 4*a*-1, when a negative voltage potential is imposed on the common electrode (403) and a positive voltage potential is imposed on the driving electrodes (404), the positively charged black particles are drawn to the common electrode (403) and the negatively charged white particles to the driving electrodes (404). As a result, a black color is seen at the viewing side.

FIG. 4*a*-2 shows the full view of FIG. 4*a*-1. The viewer will only see the black color from the viewing side (403). The white color at the side of the driving electrodes is blocked by the black particles and thus not seen at the viewing side.

In FIG. 4*b*-1, when a negative voltage potential is imposed on the driving electrodes (404) and a positive voltage potential is imposed on the common electrode (403), the positively charged black particles are then drawn to the driving electrodes (404) and the negatively charged white particles to the common electrode (403). As a result, a white color is seen at the viewing side.

FIG. 4*b*-2 shows the full view of FIG. 4*b*-1. The viewer will only see the white color from the viewing side (403). The black color at the side of the driving electrodes is blocked by the white particles and thus not seen at the viewing side.

FIG. 4*c*-1 shows a scenario in which a negative voltage potential is imposed on the designated electrode (404*by*) and a positive voltage potential is imposed on all non-designated driving electrodes (e.g., 404*bx* and 404*bz*). The common electrode (403) is held at ground. In this case, the negatively charged white particles are moved to be at or near the non-designated electrodes whereas the positively charged black particles are at or near the designated driving electrode (404*by*).

FIG. 4*c*-2 shows the full view of FIG. 4*c*-1. As shown, the black particles are drawn to be at or near the designated electrode 404*by* while the white particles are drawn to be at or near the non-designated electrodes. The incident light passes through the green fluid and strikes the white particles and then reflects back to the viewer. In the meantime, a small portion of the light strikes the black particles and becomes absorbed. Since the area of the white particles is dominant over that of the black particles, a green color is seen and an acceptable reflectance of the green color state can be expected.

In one embodiment of the color display device, the designated electrode(s) is/are consistently placed in a certain area on the second layer of each display cell to gather the black particles. In this case, the size and the location of the light losing areas (because of the black particles) are then fixed, which improves the uniformity of the color state. The area of the second layer for the designated electrode(s) may be the center area of the second layer.

Figures 1, 5A:
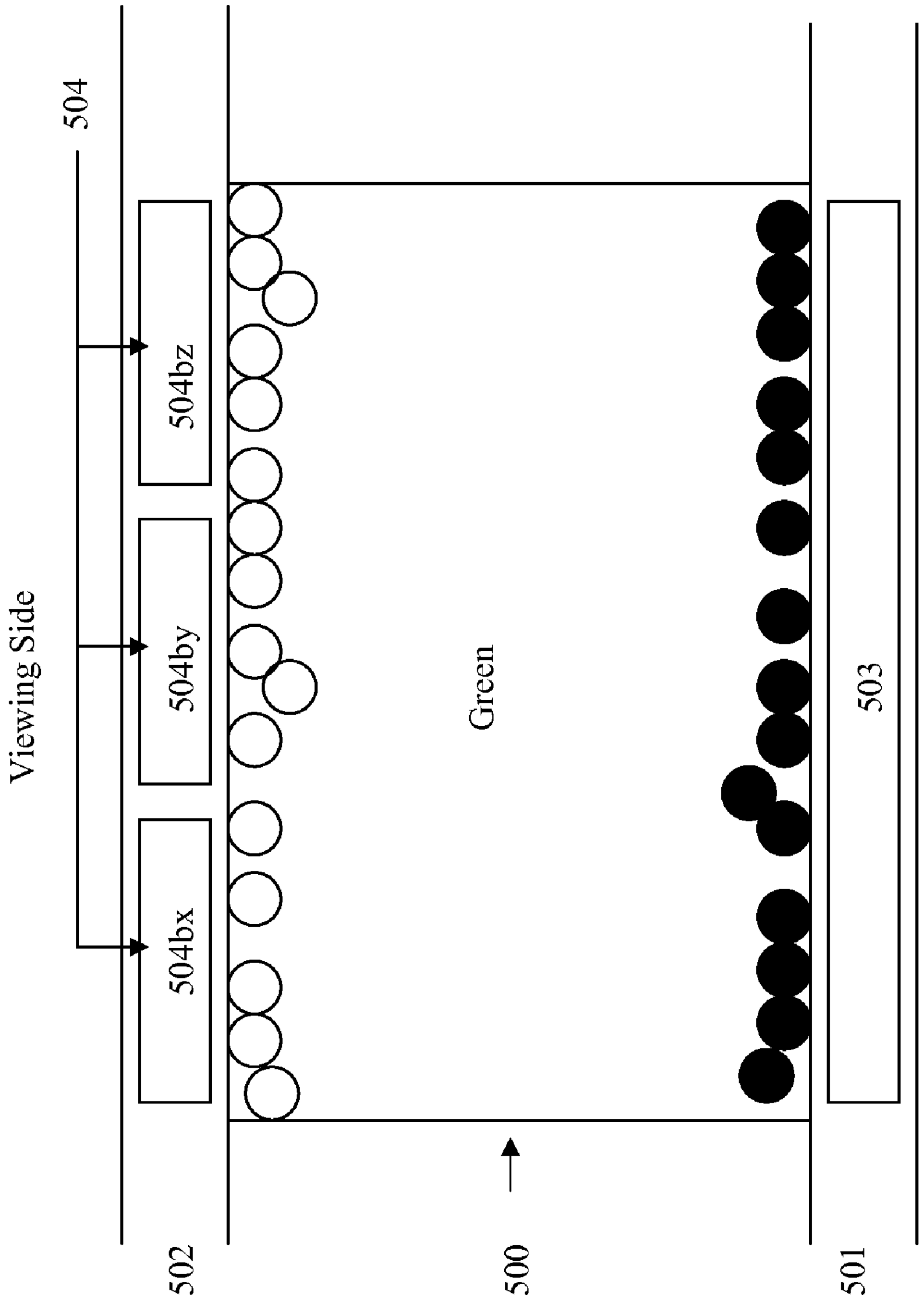
FIGS. 5*a*-5*c* illustrate an alternative design of the color display device.
Figures 2, 5A:
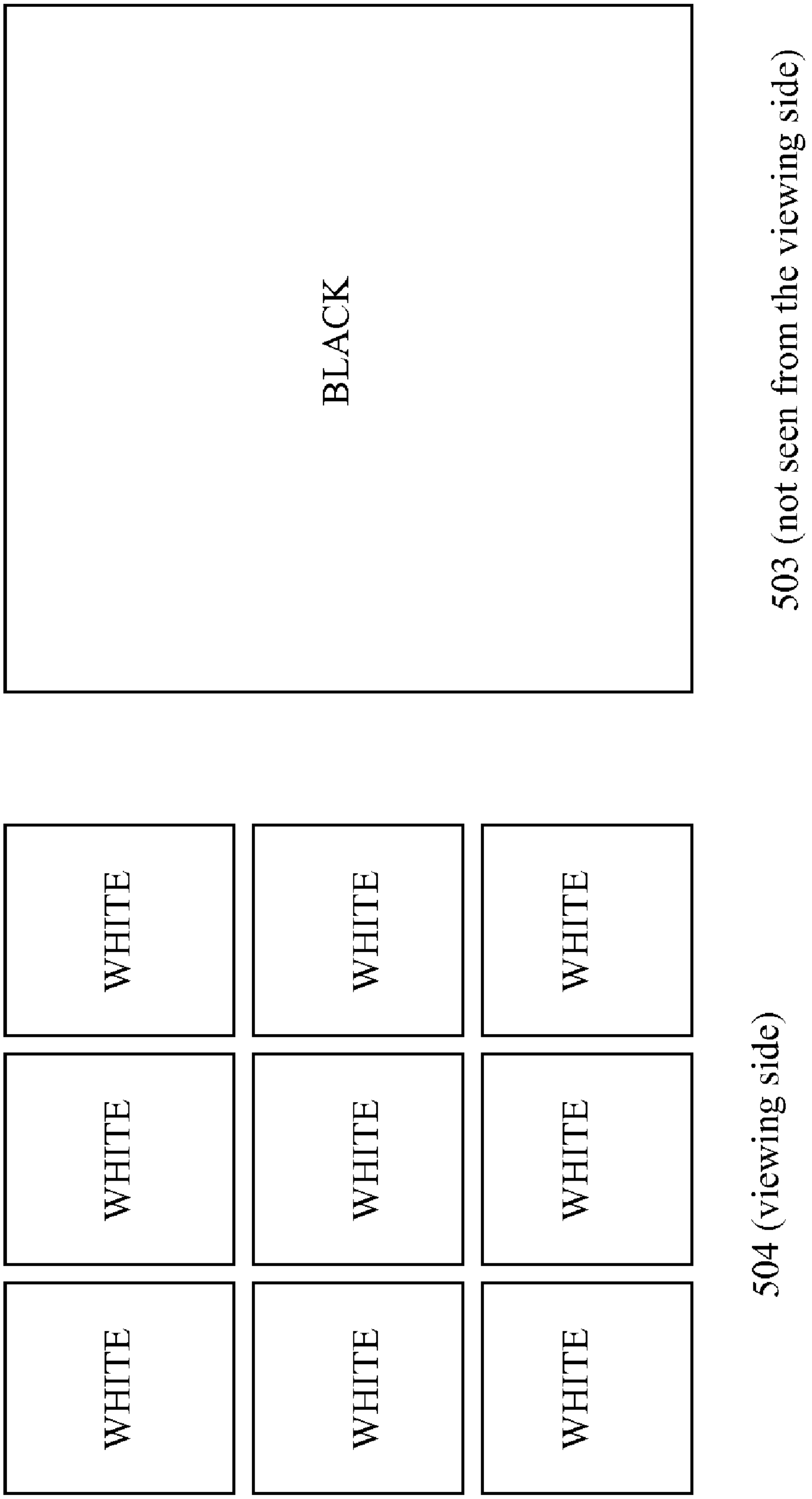
Figures 1, 5B:
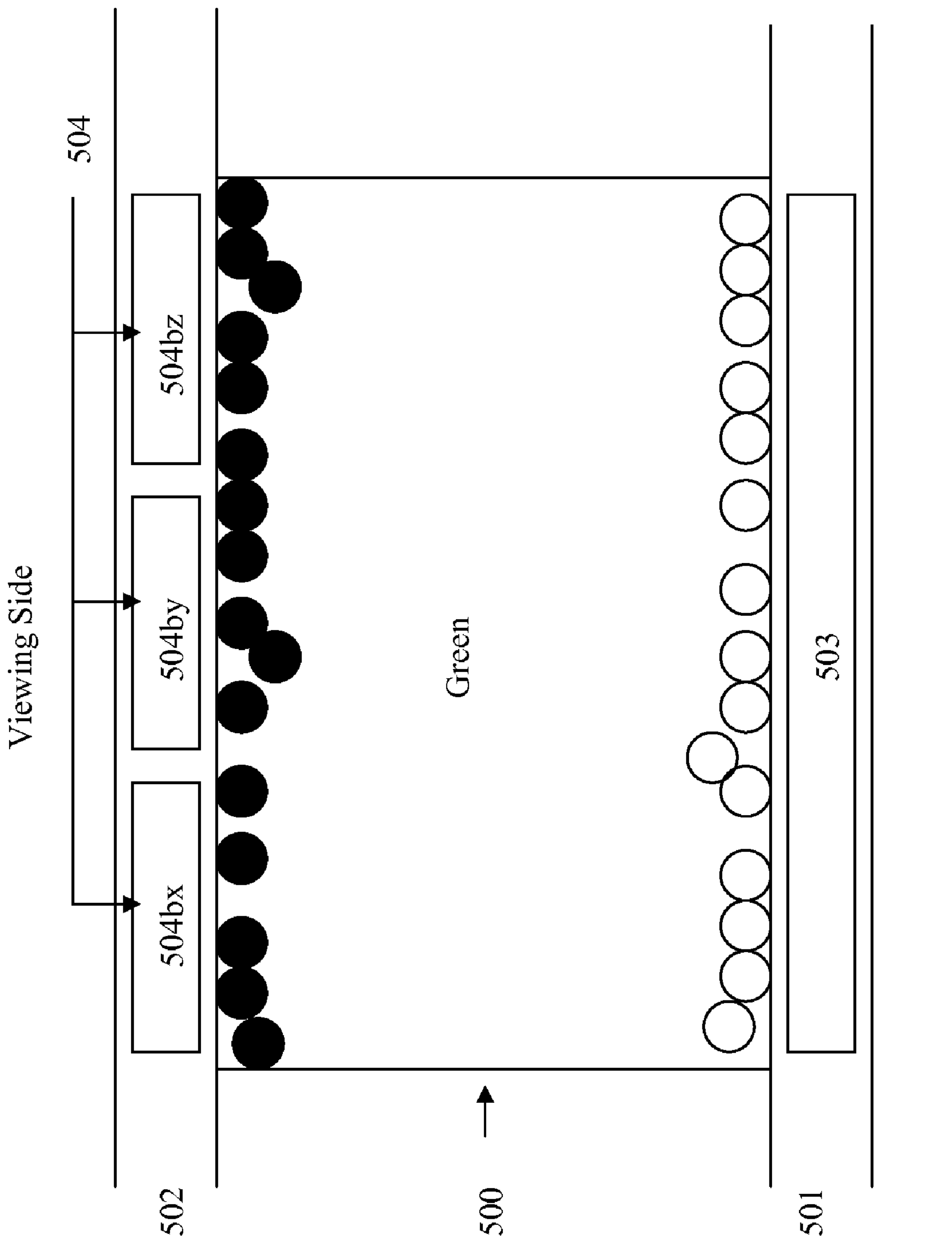
Figures 2, 5B:
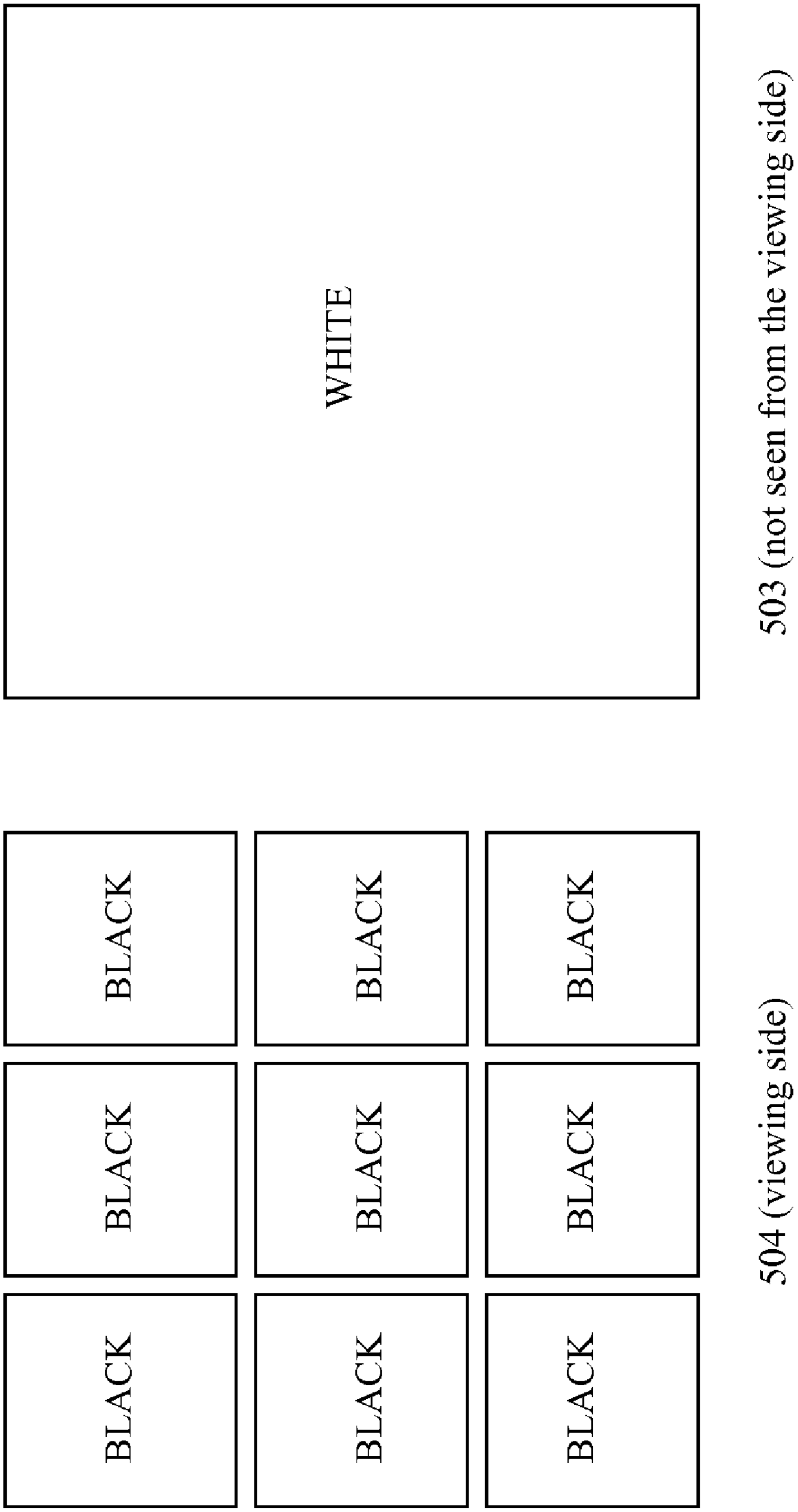
Figures 1, 5C:
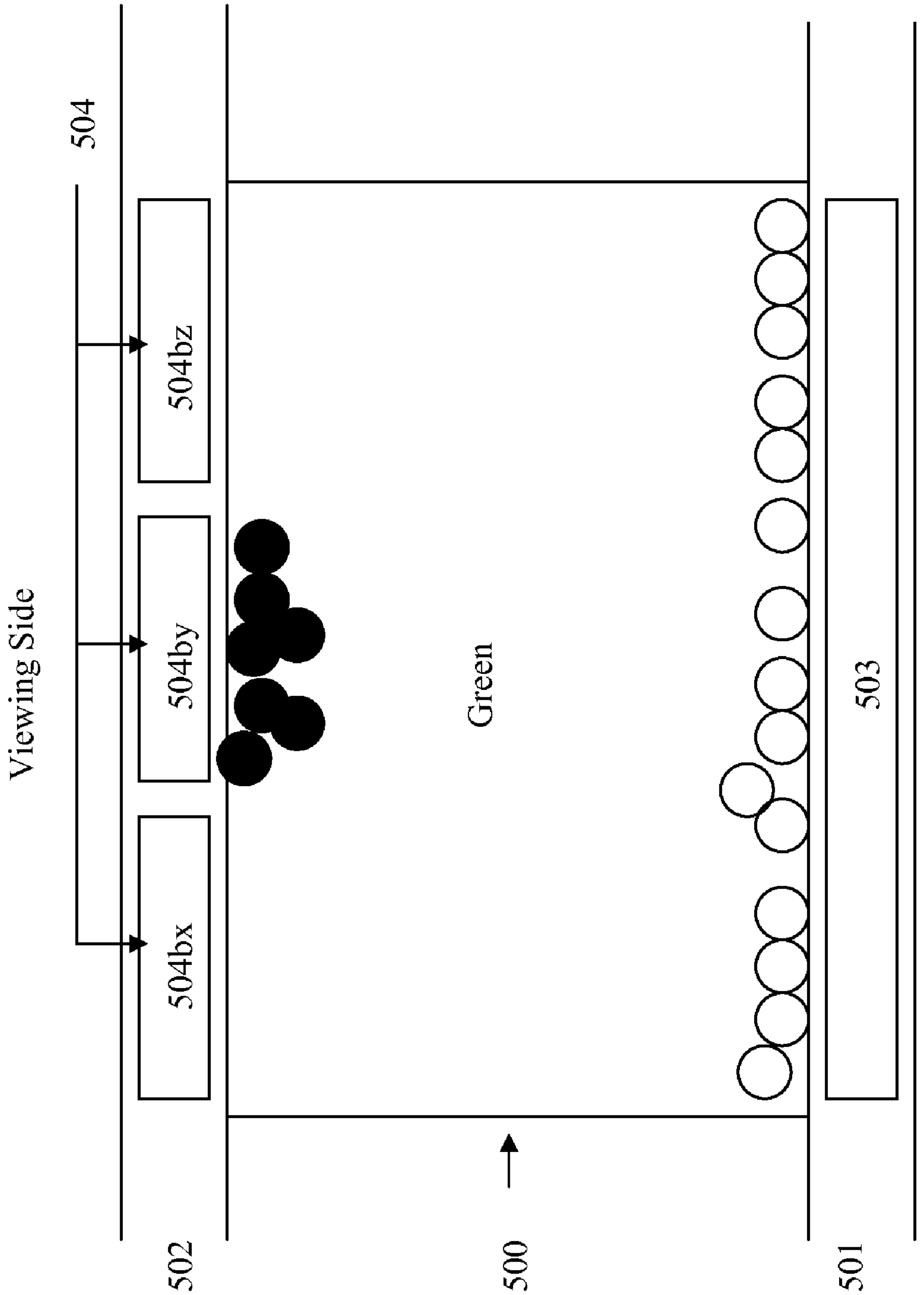
Figures 2, 5C:
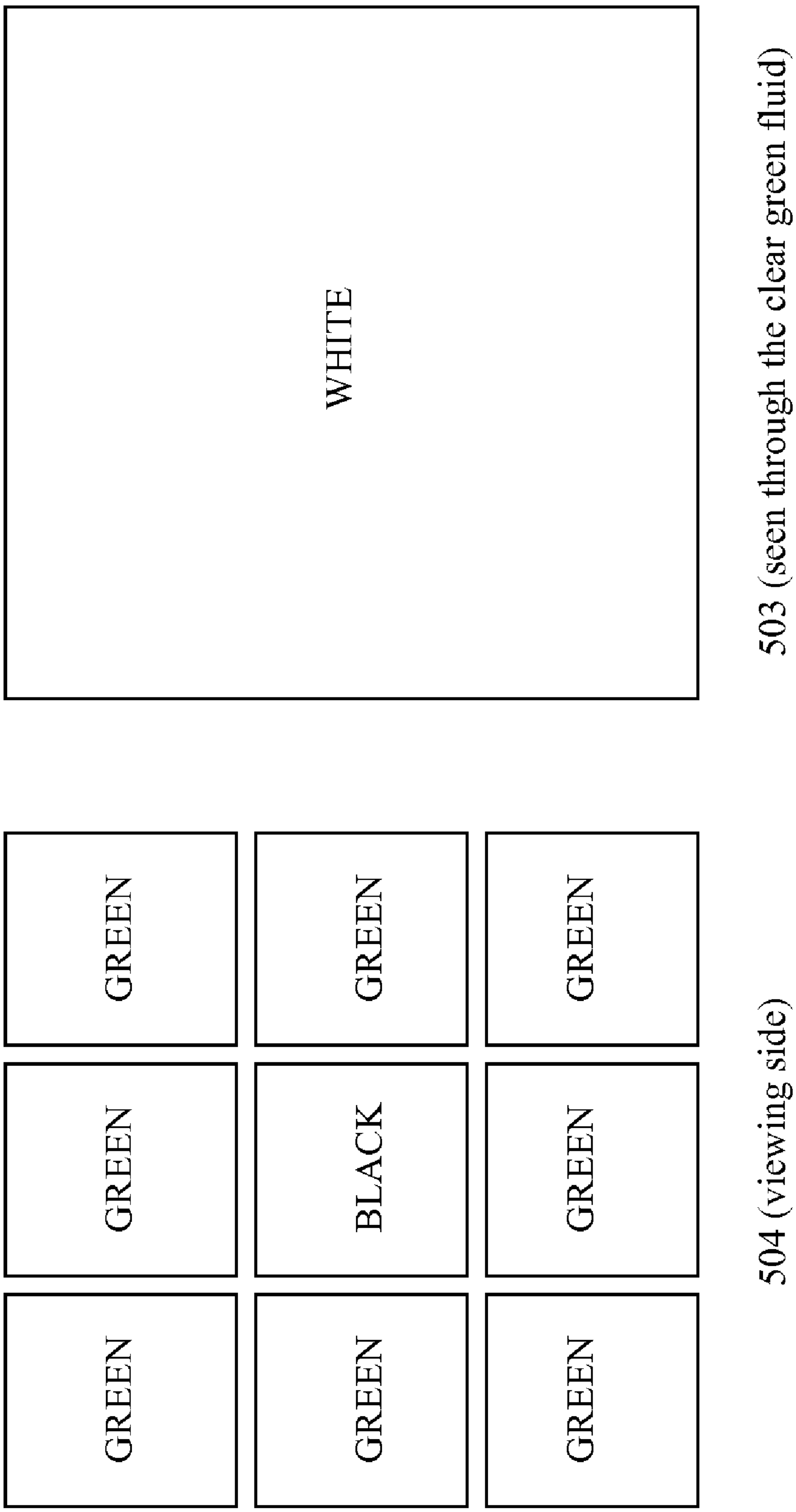

FIGS. 5*a*-5*c* is an alternative design of the display device as described in Section II.

The display cell (500), in this design, is also sandwiched between a first layer (501) and a second layer (502). The first layer comprises a common electrode (503). The second layer comprises more than one driving electrodes. As shown the color display device is viewed from the driving electrode side (i.e., the second layer) instead of the common electrode side (i.e., the first layer).

The driving electrodes are transparent. While only three driving electrodes are shown, it is assumed that the driving electrodes on the second layer have a 3×3 grid and the driving electrode 504*by* is the designated electrode.

The multiple driving electrodes within a display cell allow the particles to migrate to one or more designated electrodes or evenly spread over all the driving electrodes.

There are two types of pigment particles in the electrophoretic fluid filled in the display cell. The two types of pigment particles are of the white and black colors, and they move independently from each other because they carry charges of opposite polarities. It is assumed that the white pigment particles are negatively charged and the black pigment particles are positively charged. It is also assumed that the two types of pigment particles are dispersed in a solvent of green color.

In FIG. 5*a*-1, when a negative voltage potential is imposed on the common electrode (503) and a positive voltage potential is imposed on the driving electrodes (504), the negatively charged white particles are drawn to the driving electrodes (504) and the positively charged black particles to the common electrode (503). As a result, a white color is seen at the viewing side.

FIG. 5*a*-2 shows the full view of FIG. 5*a*-1. The viewer will only see the white color from the viewing side (504). The black color at the common electrode side is blocked by the white particles and thus not seen at the viewing side.

In FIG. 5*b*-1, when a negative voltage potential is imposed on the driving electrodes (504) and a positive voltage potential is imposed on the common electrode (503), the positively charged black particles are drawn to the driving electrodes (504) and the negatively charged white particles to the common electrode (503). As a result, a black color is seen at the viewing side.

FIG. 5*b*-2 shows the full view of FIG. 5*b*-1. The viewer will only see the black color from the viewing side (504). The white color at the common electrode side is blocked by the black particles and thus not seen at the viewing side.

FIG. 5*c*-1 shows a scenario in which a negative voltage potential is imposed on the designated electrode (504*by*) and a positive voltage potential is imposed on the common electrode (503). The non-designated electrodes are held at ground. In this case, the negatively charged white particles move to be at or near the common electrode (503) while the positively charged black pigment particles move to be at or near the designated electrode (504*by*). As a result, a green color is seen from the viewing side.

FIG. 5*c*-2 shows the full view of FIG. 5*c*-1. The white color at the common electrode side is seen through the clear green fluid; thus a green color is seen at the viewing side. The area of the green color is dominant over that of the black particles (at designated driving electrode 504*by*), from the viewing side.

III. An Alternative Design

Figures 1, 6A:
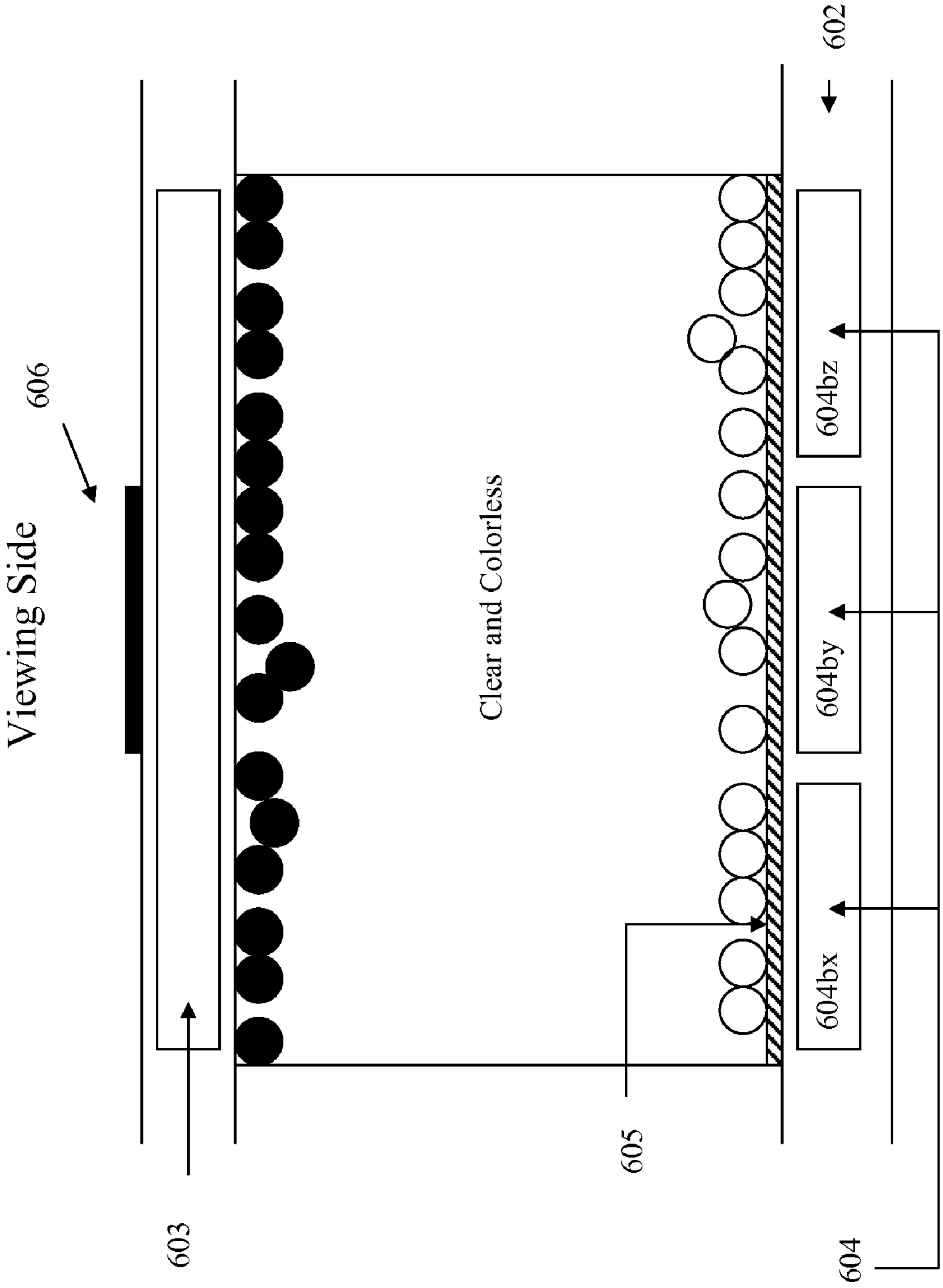
FIGS. 6*a*-6*c* illustrate a further alternative design.
Figures 2, 6A:
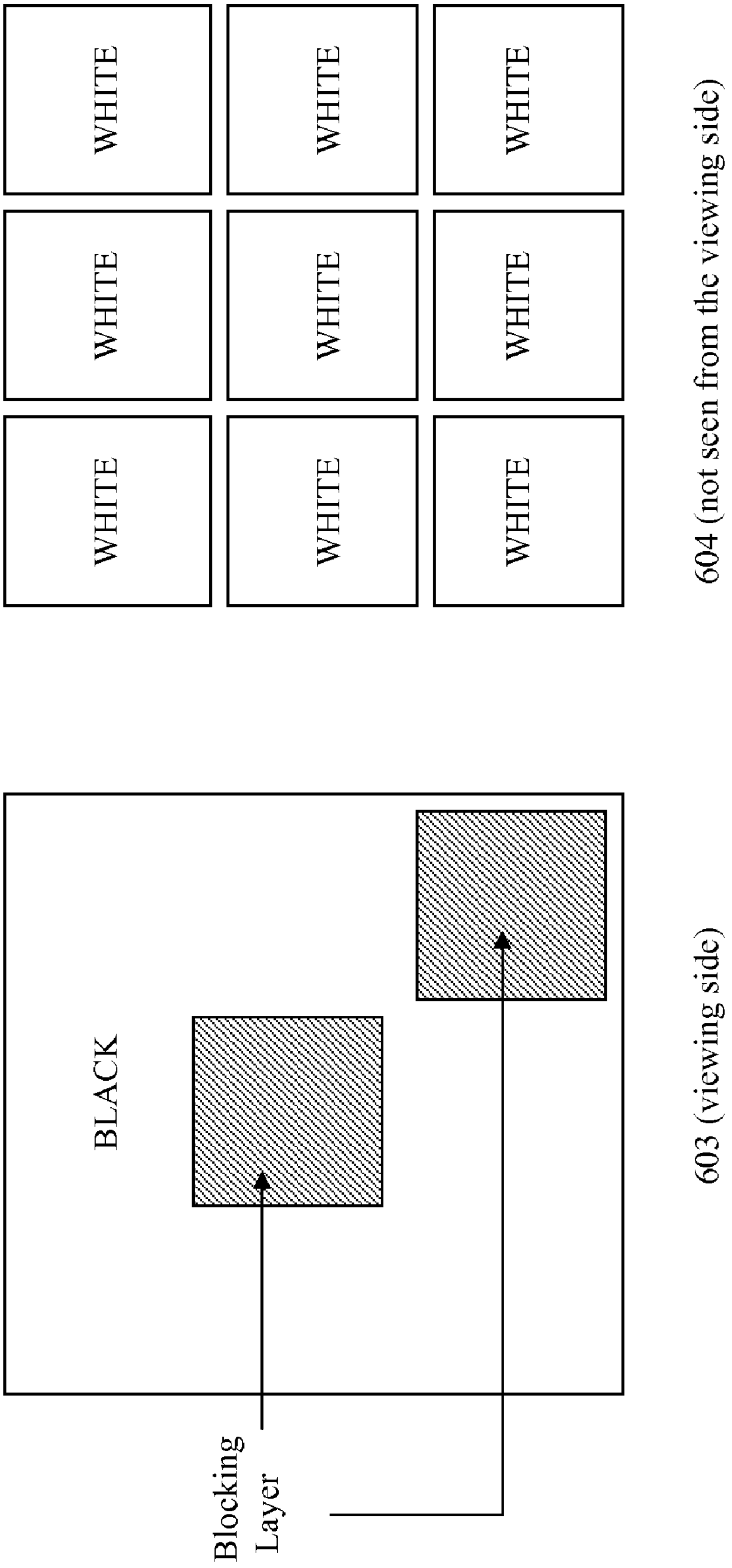
Figures 1, 6B:
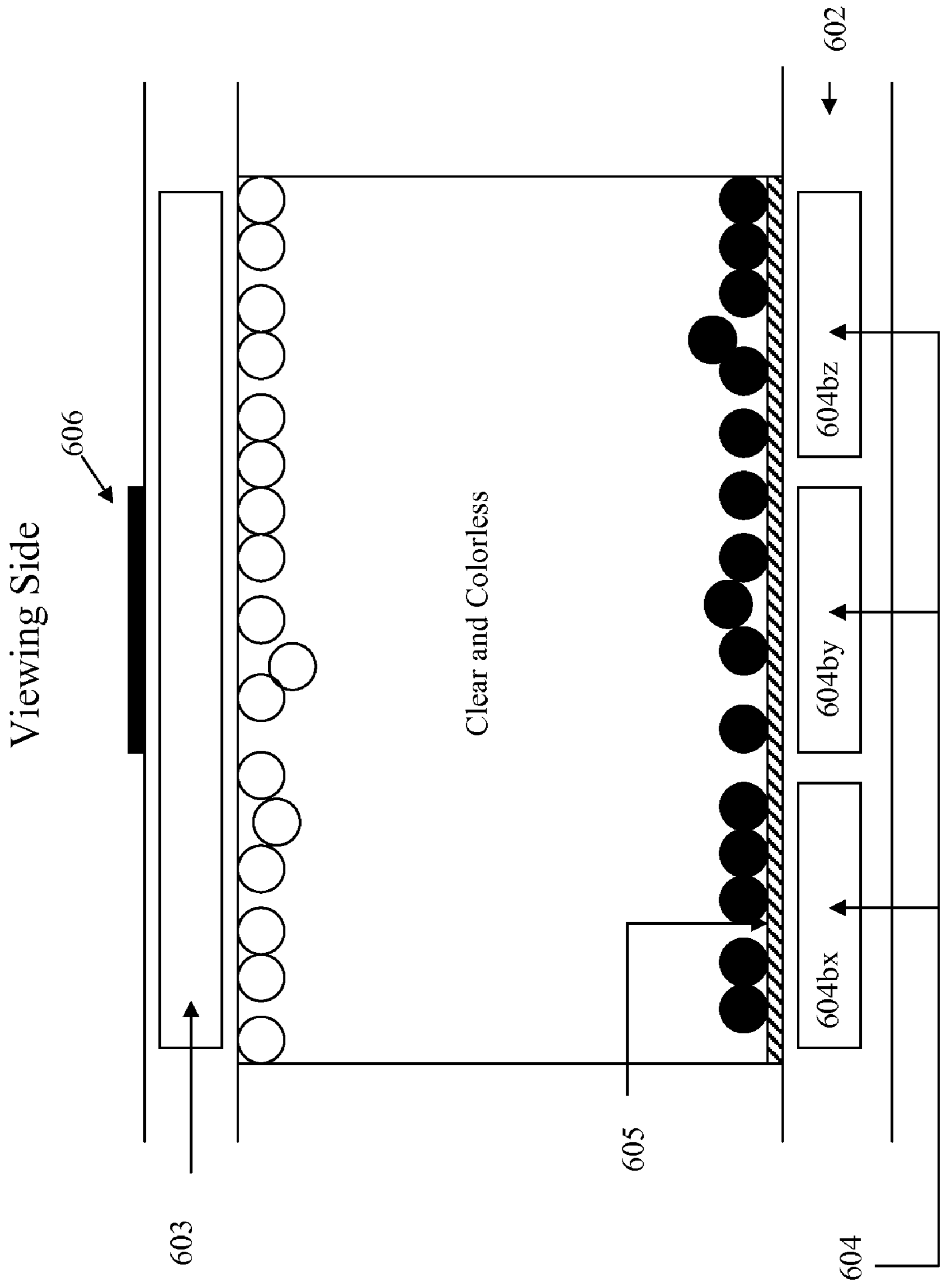
Figures 2, 6B:
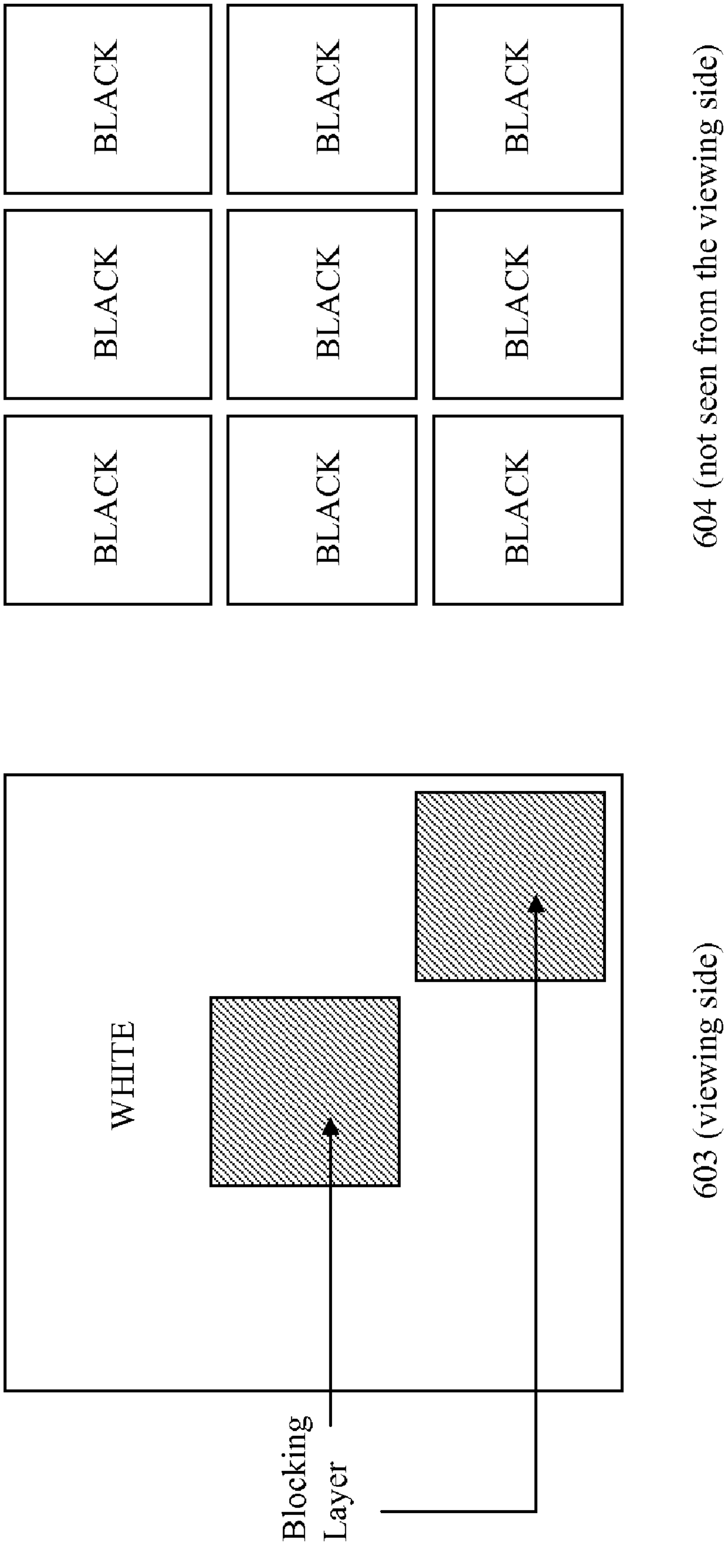
Figures 1, 6C:
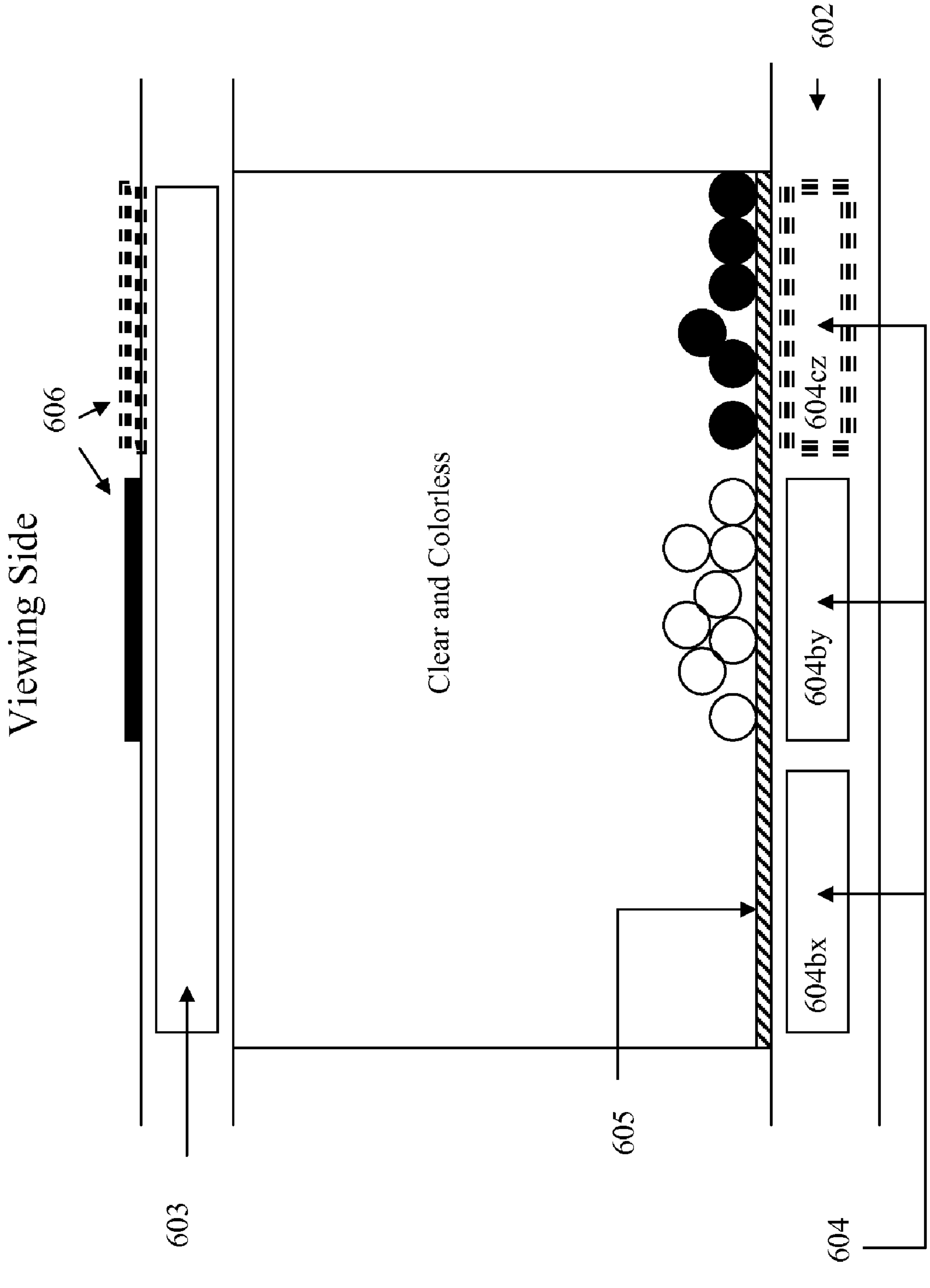
Figures 2, 6C:
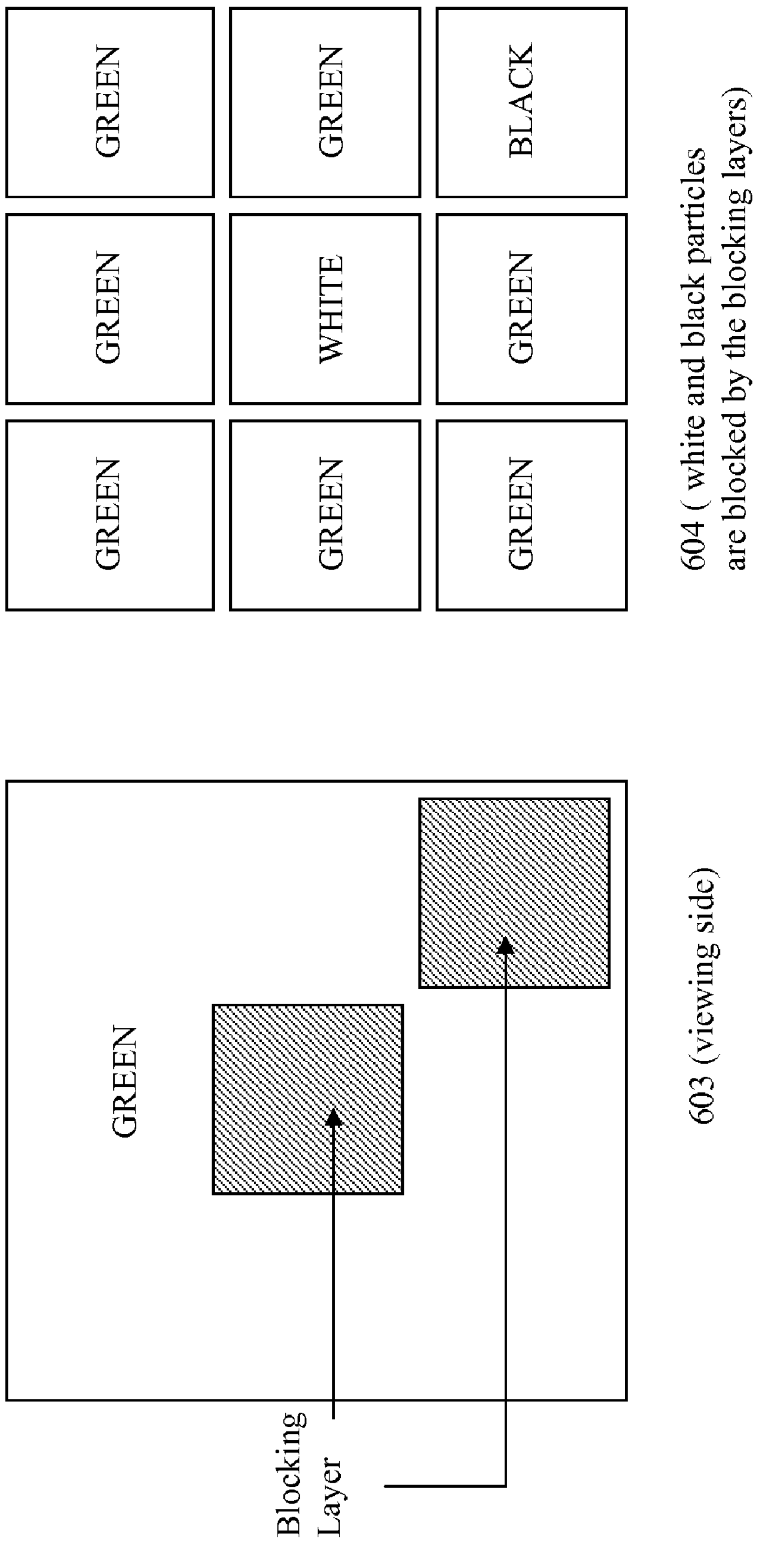

FIGS. 6*a*-6*c* illustrate an alternative design. There are two types of pigment particles in the electrophoretic fluid filled in the display cell. It is also assumed that the two types of pigment particles are dispersed in a clear and colorless solvent and the display cell has a background layer (605) of green color. The background layer may be above or below the second layer (602), or the second layer may serve as a background layer.

The two types of pigment particles are of the white and black colors, and they move independently from each other because they carry charges of opposite polarities. It is assumed that the white pigment particles are negatively charged and the black pigment particles are positively charged.

It is also assumed that the driving electrodes on the second layer have a 3×3 grid as shown in FIG. 1*b*. Among the 9 driving electrodes, there are two designated electrodes 604*by* and 604*cz* and the remaining driving electrodes are non-designated electrodes. The common electrode 603 is transparent.

In this design, blocking layers (606) are needed to block out the designated electrodes from being seen by the viewer. The blocking layers may be black matrix layers or a brightness enhancement structure comprising micro-structures or micro-reflectors, the details of which are discussed in sections below.

In FIG. 6*a*-1, when a negative voltage potential is imposed on the common electrode (603) and a positive voltage potential is imposed on the driving electrodes (604), the positively charged black particles are drawn to the common electrode (603) and the negatively charged white particles to the driving electrodes (604). As a result, a black color is seen at the viewing side.

FIG. 6*a*-2 shows the full view of FIG. 6*a*-1. The white color at the side of driving electrodes is blocked by the black particles and the blocking layers; thus not seen from the viewing side.

In FIG. 6*b*-1, when a negative voltage potential is imposed on the driving electrodes (604) and a positive voltage potential is imposed on the common electrode (603), the positively charged black particles are then drawn to the driving electrodes (604) and the negatively charged white particles to the common electrode (603). As a result, a white color is seen at the viewing side.

FIG. 6*b*-2 shows the full view of FIG. 6*b*-1. The black color at the side of driving electrodes is blocked by the white particles and the blocking layers; thus not seen from the viewing side.

In FIG. 6*c*-1, a positive voltage potential is imposed on the designated electrode 604*by*, a negative voltage potential is imposed on the designated electrode 604*cz* and the remaining driving electrodes and the common electrode are held at ground. In this case, the positively charged black particles are drawn to the designated electrode 604*cz* and the negatively charged white particles to the designated electrode 604*by*.

Because of the presence of the blocking layers (606), the black and white particles gathering at or near the designated electrodes will not be seen by the viewer. Instead, the viewer will see the green color of the background layer. It is also possible to block out only the white particles and in this case, the blocking layer (606) will only be present for designated electrode 604*by*.

FIG. 6*c*-2 shows the full view of FIG. 6*c*-1. The green background color is seen through the clear and colorless fluid while the white and black particles are blocked from the viewing side by the blocking layers.

In one embodiment of this design, the designated electrodes are consistently placed in certain area(s) on the second layer of each display cell to gather the black and white particles. In this case, the size and the location of where the black and white particles gather are fixed, which improves the uniformity of the color state.

In this alternative design, the second layer comprising multiple driving electrodes is considered a sub-pixel. In this case, the background layer (605) must be aligned with the second layer (602).

However, the boundary of the second layer does not have to be aligned with the boundary of the fluid area; but the designated electrode(s) must be within the boundary of the fluid area. The designated electrodes within the boundary of the fluid area are at least one for the white particles and at least one for the black particles.

Figure 11:
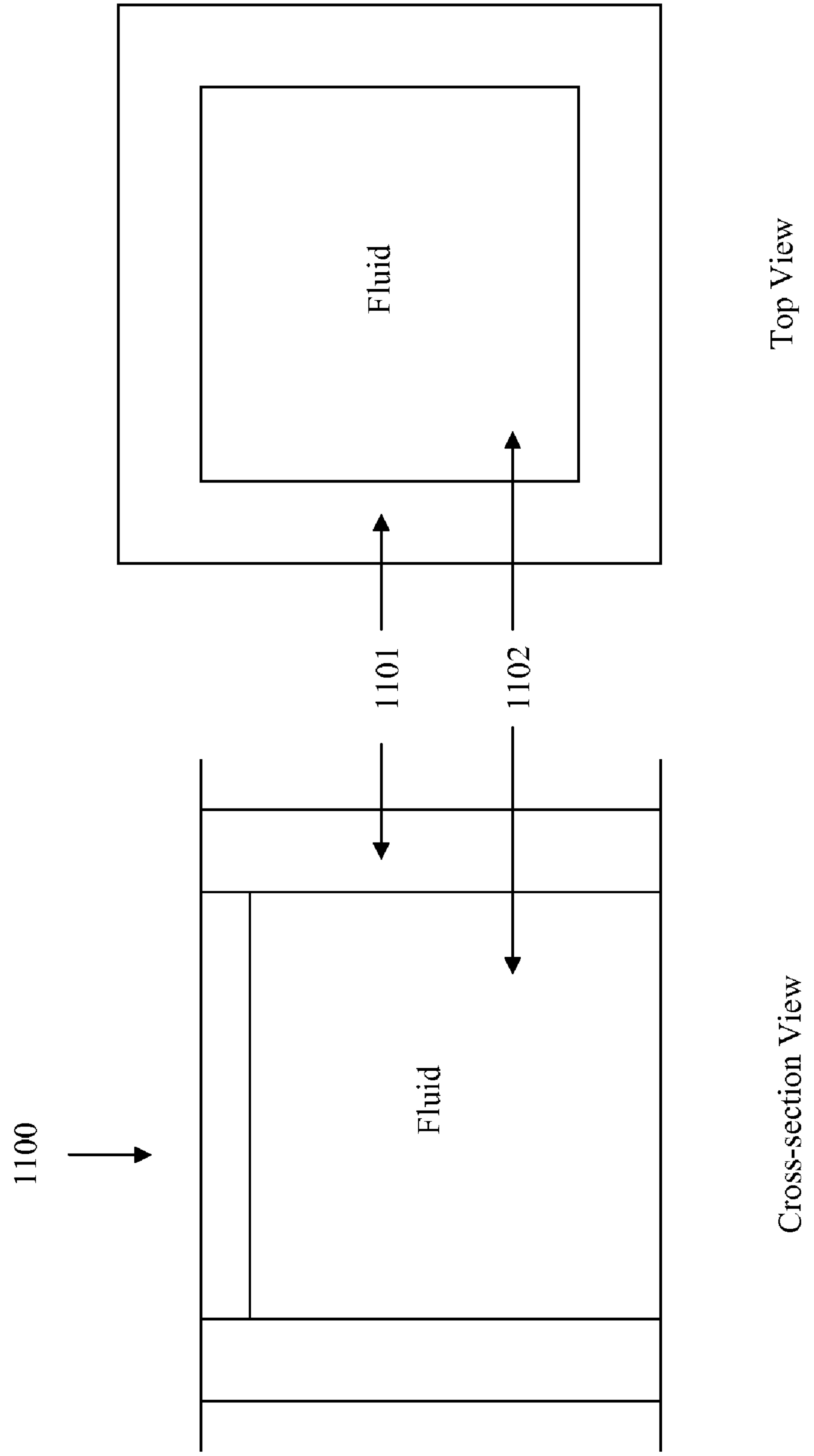
FIG. 11 illustrates the term "fluid area".

The term "fluid area", in the context of this application, is intended to refer to the top view of the area filled with the clear and colorless solvent or solvent mixture. An example is given in FIG. 11 which shows that in the MICROCUP® structure, wherein a microcup (1100) is filled with a display fluid and separated from other microcups by partition walls (1101), the "fluid area" (1102) would be the top view of the area in the microcup where the display fluid is filled, discounting the partition walls. The microcup structure is disclosed in details in U.S. Pat. No. 6,930,818, which is incorporated herein by reference in its entirety.

Figures 1, 7A:
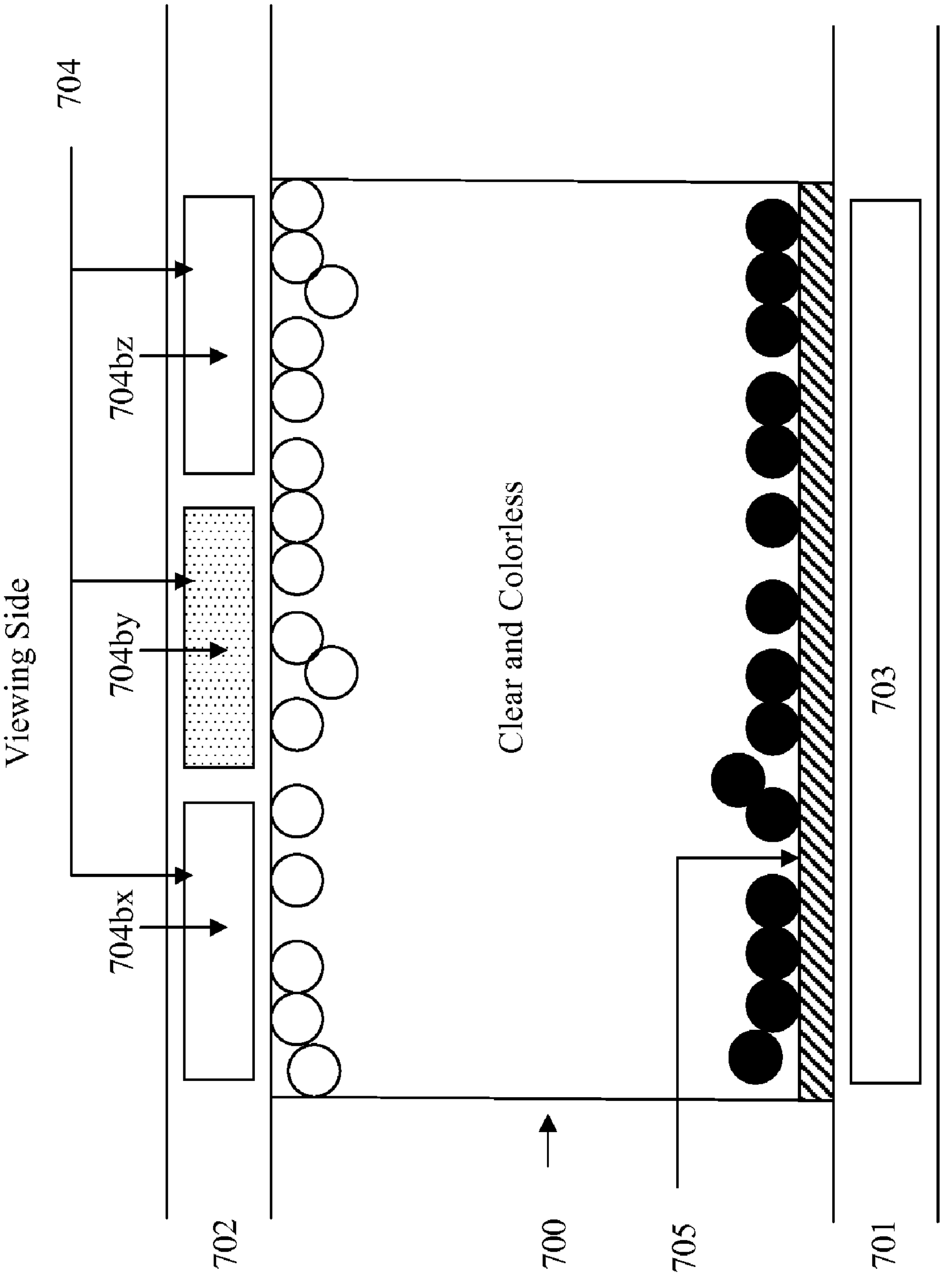
FIGS. 7*a*-7*c* illustrate a further alternative design.
Figures 2, 7A:
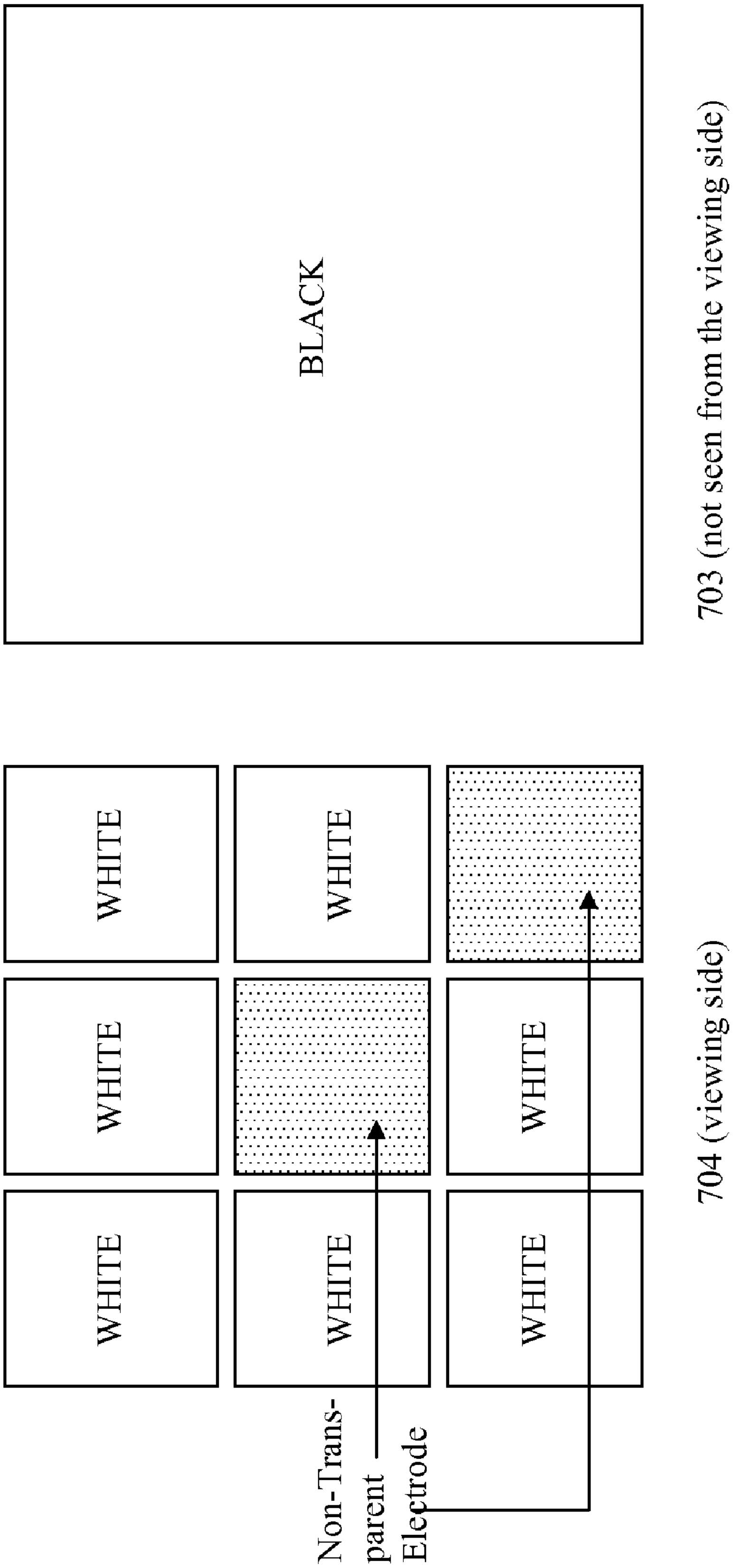
Figures 1, 7B:
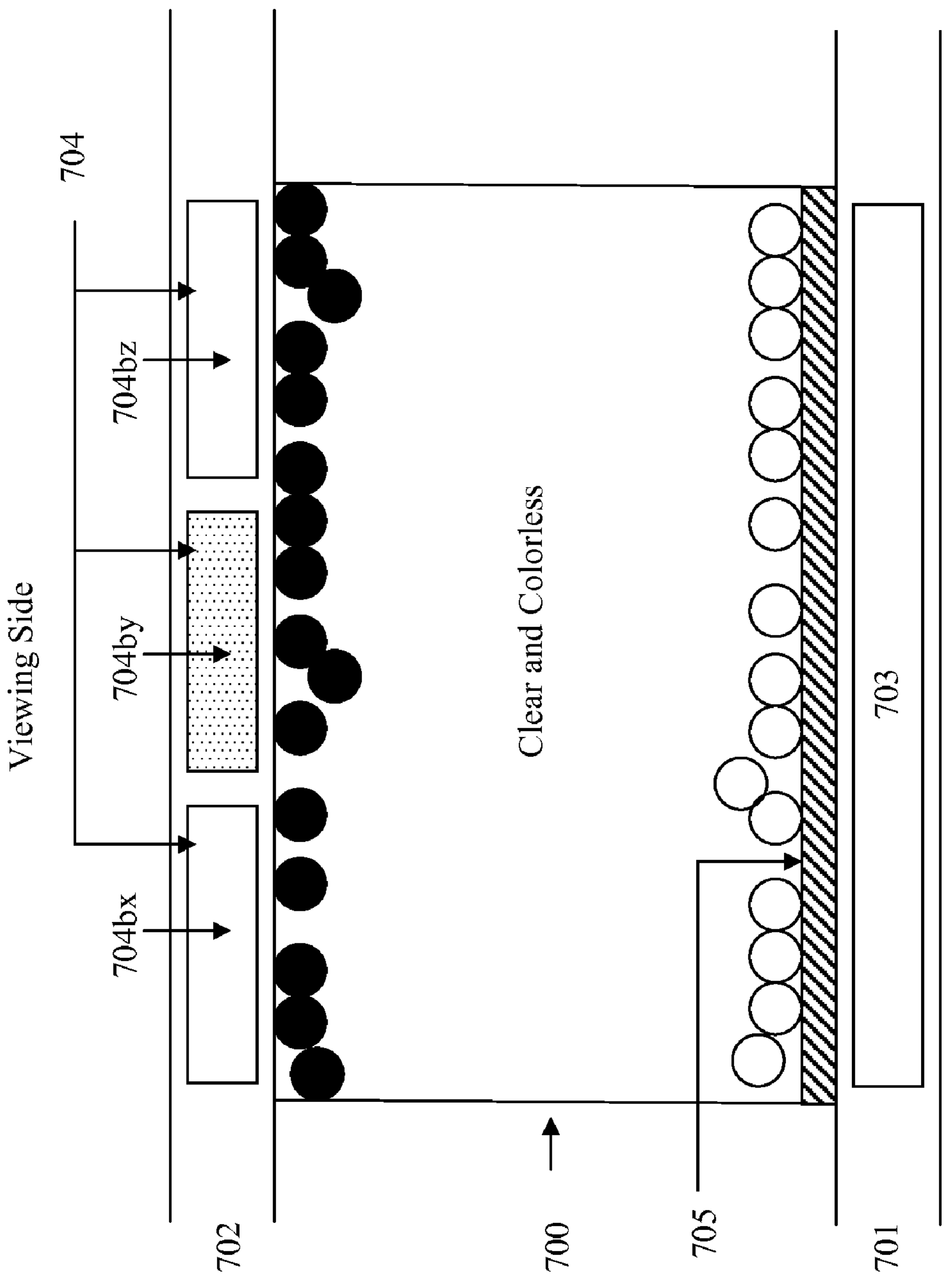
Figures 2, 7B:
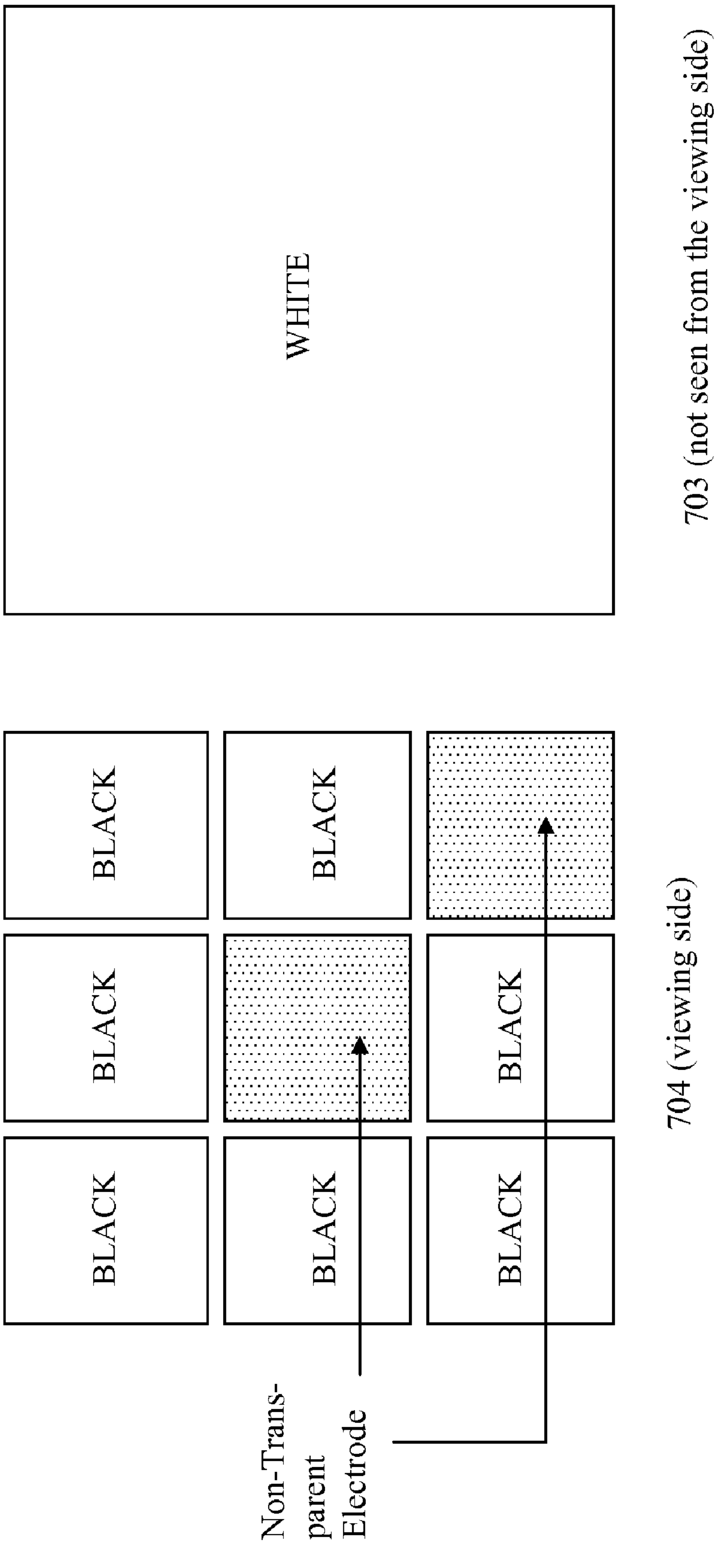
Figures 1, 7C:
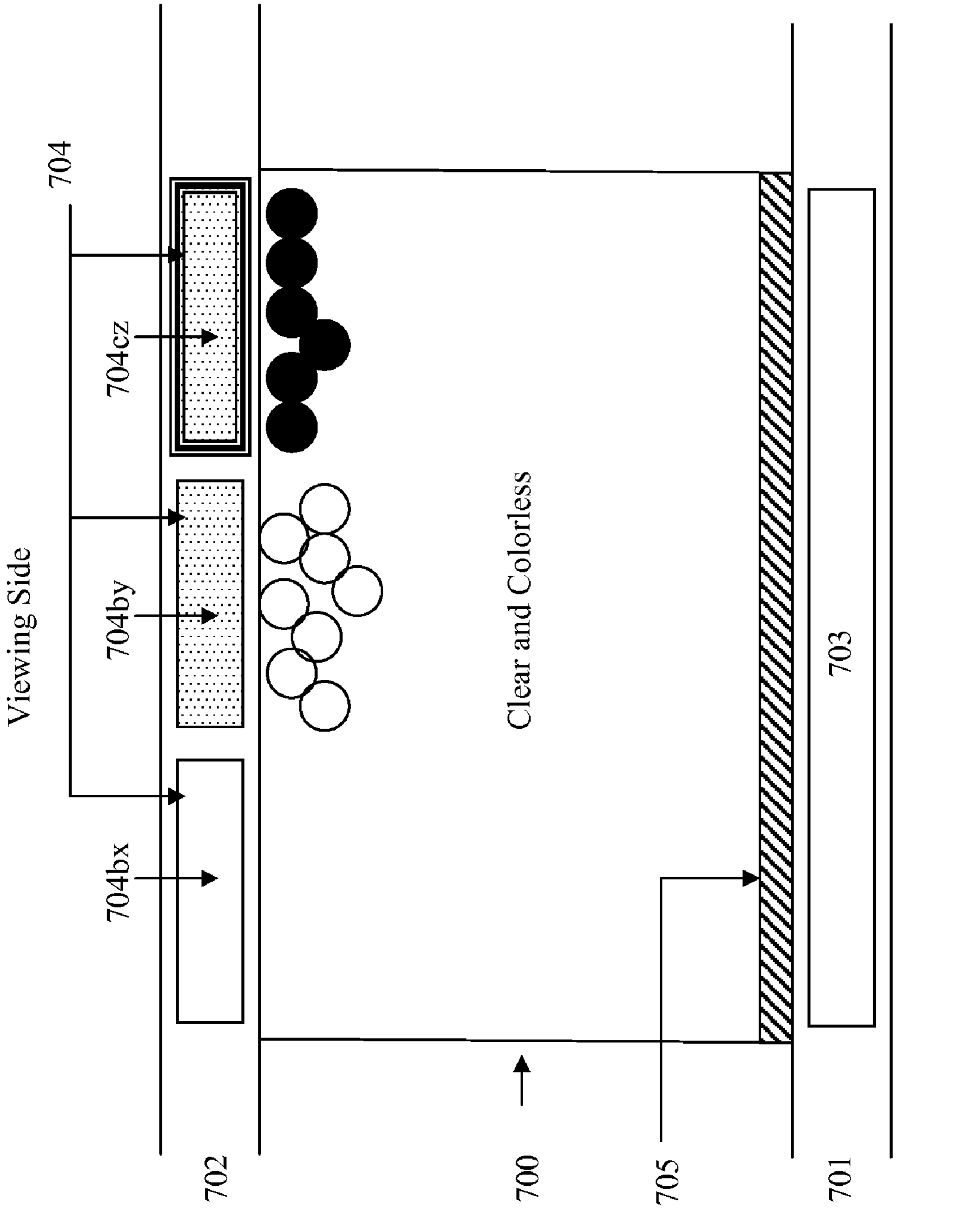
Figures 2, 7C:
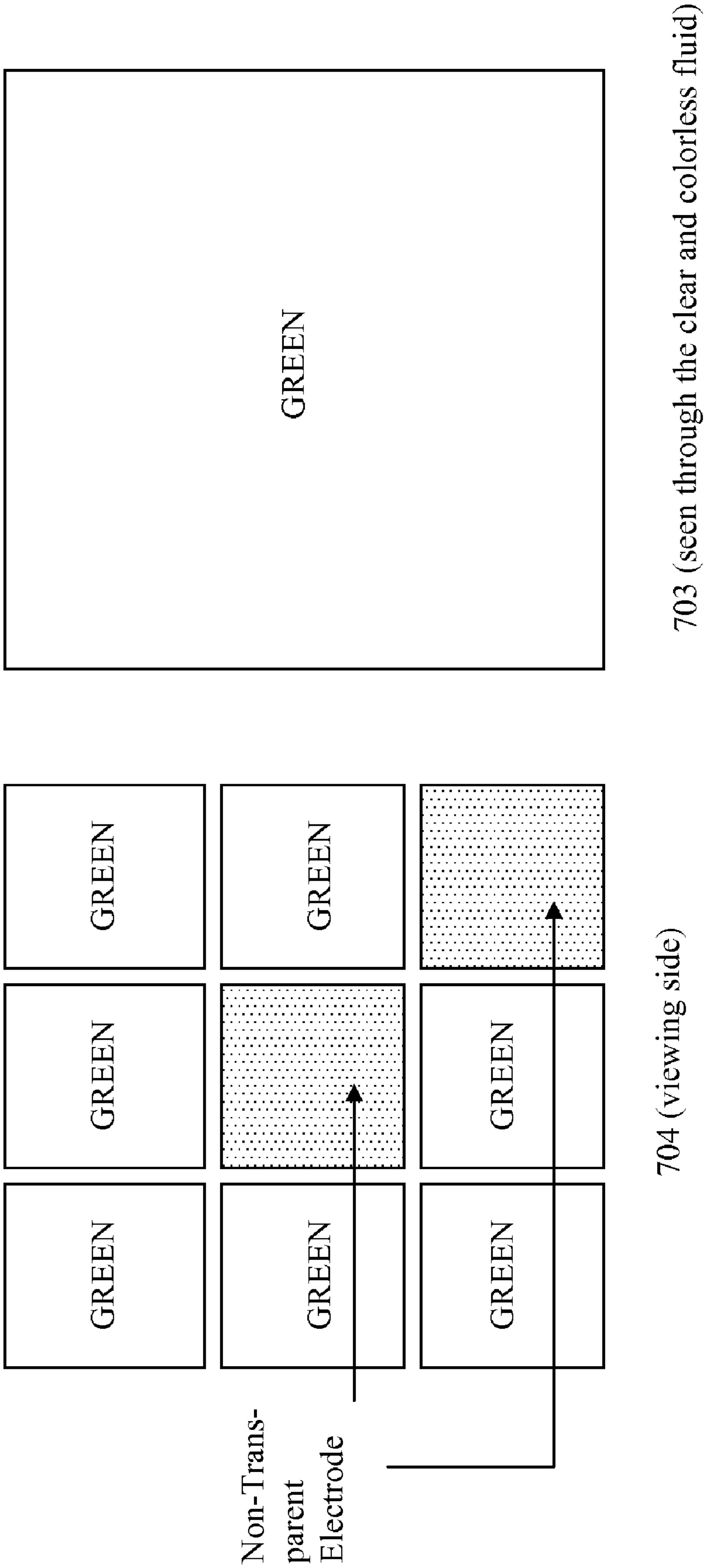

FIGS. 7*a*-7*c* illustrate an alternative design of the display device described in Section III.

The display cell (700), in this case, is also sandwiched between a first layer (701) and a second layer (702). The first layer comprises a common electrode (703). The second layer comprises more than one driving electrodes. As shown the color display device is viewed from the driving electrode side (i.e., the second layer) instead of the common electrode side (i.e., the first layer).

It is assumed that the driving electrodes on the second layer have a 3×3 grid and there are two designated driving electrodes 704*by* and 704*cz*. The remaining driving electrodes are non-designated electrodes.

In addition, the designated electrodes 704*by* and 704*cz* are not transparent. For example, they may be opaque. The remaining driving electrodes are transparent. Alternatively, the designated electrodes 704*by* and 704*cz* may be transparent and in this case, blocking layer are needed.

The multiple driving electrodes within a display cell allow the particles to migrate to one or more designated electrodes or evenly spread over all the driving electrodes.

There are two types of pigment particles in the electrophoretic fluid filled in the display cell. The two types of pigment particles are dispersed in a clear and colorless solvent. There is a background layer (705) in this design which is assumed to be of a green color. The background layer may be above or below the first layer (701) or the first layer (701) may serve as a background layer.

The two types of pigment particles are of the white and black colors, and they move independently from each other because they carry charges of opposite polarities. It is assumed that the white pigment particles are negatively charged and the black pigment particles are positively charged.

In FIG. 7*a*-1, when a negative voltage potential is imposed on the common electrode (703) and a positive voltage potential is imposed on the driving electrodes (704), the negatively charged white particles are drawn to the driving electrodes (704) and the positively charged black particles to the common electrode (703). As a result, a white color is seen at the viewing side.

FIG. 7*a*-2 shows the full view of FIG. 7*a*-1. The black color at the common electrode side is blocked by the white particles and the non-transparent driving electrodes.

In FIG. 7*b*-1, when a negative voltage potential is imposed on the driving electrodes (704) and a positive voltage potential is imposed on the common electrode (703), the positively charged black particles are drawn to the driving electrodes (704) and the negatively charged white particles to the common electrode (703). As a result, a black color is seen at the viewing side.

FIG. 7*b*-2 shows the full view of FIG. 7*b*-1. The white color at the common electrode side is blocked by the black particles and the non-transparent driving electrodes.

FIG. 7*c*-1 shows a scenario in which a positive voltage potential is imposed on the designated electrode (704*by*), a negative voltage potential is imposed on the designated electrode (704*cz*) and the remaining driving electrodes and the common electrode are held at ground. In this case, the negatively charged white particles move to be at or near the designated electrode (704*by*) while the positively charged black pigment particles move to be at or near the designated electrode (704*cz*). Because the designated electrodes are not transparent, a viewer will see the green color of the background layer through the non-designated electrodes.

In this design, it is also possible to have only the designated electrode collecting the white particles to be non-transparent or opaque.

FIG. 7*c*-2 shows the full view of FIG. 7*c*-1. The green background color is seen through the transparent driving electrodes while the white and black particles are blocked by the non-transparent driving electrodes from the viewing side.

The total area of the non-designated electrode(s) in a display device described in this section is also preferably at least three times, more preferably at least six times and most preferably at least eight times, the total area of the designated electrodes(s).

In this further alternative design, the second layer comprising multiple driving electrodes is considered a sub-pixel. In this case, the background layer (705) must be aligned with the second layer (702).

However, the boundary of second layer does not have to be aligned with the boundary of the fluid area which is the area filled with the clear and colorless solvent or solvent mixture; but the designated electrode(s) must be within the boundary of the fluid area. The designated electrodes within the boundary of the fluid area are at least one for the white particles and at least one for the black particles.

In the present invention, each pixel may consist of three display cells, each comprising black and white particles dispersed in a red, green or blue solvent, respectively. A white pixel is achieved by turning all three display cells to the white state. A black pixel is achieved by turning all three display cells to the black state. A red pixel is achieved by turning the display cell with a red fluid to red and the remaining two display cells to both black, both white or one black and one white. A green or blue pixel may be similarly achieved.

V. Black Matrix Layers

The blocking layers referred to above may be black matrix layers. The black matrix layers, when present, are on the viewing side of a display device. The positions of the black matrix layers correspond to the positions of the designated electrodes, so that the charged pigment particles gathered at or near the designated electrodes will not be seen, from the viewing side.

The black matrix layer may be applied by a method such as printing, stamping, photolithography, vapor deposition or sputtering with a shadow mask. The optical density of the black matrix may be higher than 0.5, preferably higher than 1. Depending on the material of the black matrix layer and the process used to dispose the black matrix, the thickness of the black matrix may vary from 0.005 μm to 50 μm, preferably from 0.01 μm to 20 μm.

In one embodiment, a thin layer of black coating or ink may be transferred onto the surface where the black matrix layers will appear, by an offset rubber roller or stamp.

In another embodiment, a photosensitive black coating may be coated onto the surface where the black matrix layers will appear and exposed through a photomask. The photosensitive black coating may be a positively-working or negatively-working resist. When a positively-working resist is used, the photomask have openings corresponding to the areas not intended to be covered by the black matrix layer. In this case, the photosensitive black coating in the areas not intended to be covered by the black matrix layer (exposed) is removed by a developer after exposure. If a negatively-working resist is used, the photomask should have openings corresponding to the areas intended to be covered by the black matrix layer. In this case, the photosensitive black coating in the areas not intended to be covered by the black matrix layer (unexposed) is removed by a developer after exposure. The solvent(s) used to apply the black coating and the developer(s) for removing the coating should be carefully selected so that they do not attack the layer of the display and other structural elements.

In a further embodiment, a photolithography method may be used. For example, the entire top surface area is first covered by a black layer; followed by coating a photoresist layer and exposing the photoresist layer in the presence of a photomask to remove sections of the photoresist and subsequently the corresponding black layer, and finally removing the remaining photoresist layer, with the black layer only remaining in the desired locations.

Alternatively, a colorless photosensitive ink-receptive layer may be applied onto the surface where the black matrix layers will appear, followed by exposure through a photomask. If a positively-working photosensitive latent ink-receptive layer is used, the photomask should have openings corresponding to the areas intended to be covered by the black matrix layer. In this case, after exposure, the exposed areas become ink-receptive or tacky and a black matrix may be formed on the exposed areas after a black ink or toner is applied onto those areas. Alternatively, a negatively-working photosensitive ink-receptive layer may be used. In this case, the photomask should have openings corresponding to the areas not intended to be covered by the black matrix layer and after exposure, the exposed areas (which are not intended to be covered by the black matrix layer) are hardened while a black matrix layer may be formed on the unexposed areas (which are intended to be covered by the black matrix layer) after a black ink or toner is applied onto those areas. The black matrix may be post cured by heat or flood exposure to improve the film integrity and physical-mechanical properties.

In another embodiment, the black matrix may be applied by printing such as screen printing or offset printing, particularly waterless offset printing.

The black matrix layers are aligned with the designated electrodes to allow the designated electrodes to be hidden from the viewer. To achieve the "hiding" effect, the width of the black matrix layer must be at least equal to the width of the designated electrode(s). It is desirable that the width of the black matrix layers is slightly greater than the width of the designated electrode(s) to prevent loss of contrast when viewed at an angle.

In another embodiment, the black matrix layers are not aligned with the designated electrodes. In this case, the width of the black matrix layers is significantly greater than the width of the designated electrodes, so that the designated electrodes may be hidden from the incoming light.

VI. Brightness Enhancement Structure

The color display device of the present invention may further comprise a brightness enhancement structure on its viewing side to improve the brightness of the images displayed by the display device. A brightness enhancement structure may also be called a luminance enhancement structure. The degree of brightness is simply the luminance phenomenon perceived by the viewer.

While the brightness enhancement structure may improve the brightness of the images displayed by a display device, it may also serve as blocking layers when needed. When serving as blocking layers, the micro-structures or micro-reflectors of the brightness enhancement structure are positioned corresponding to the designated electrodes, so that the charged pigment particles gathered at or near the designated electrodes will not be seen, from the viewing side.

Figure 8:
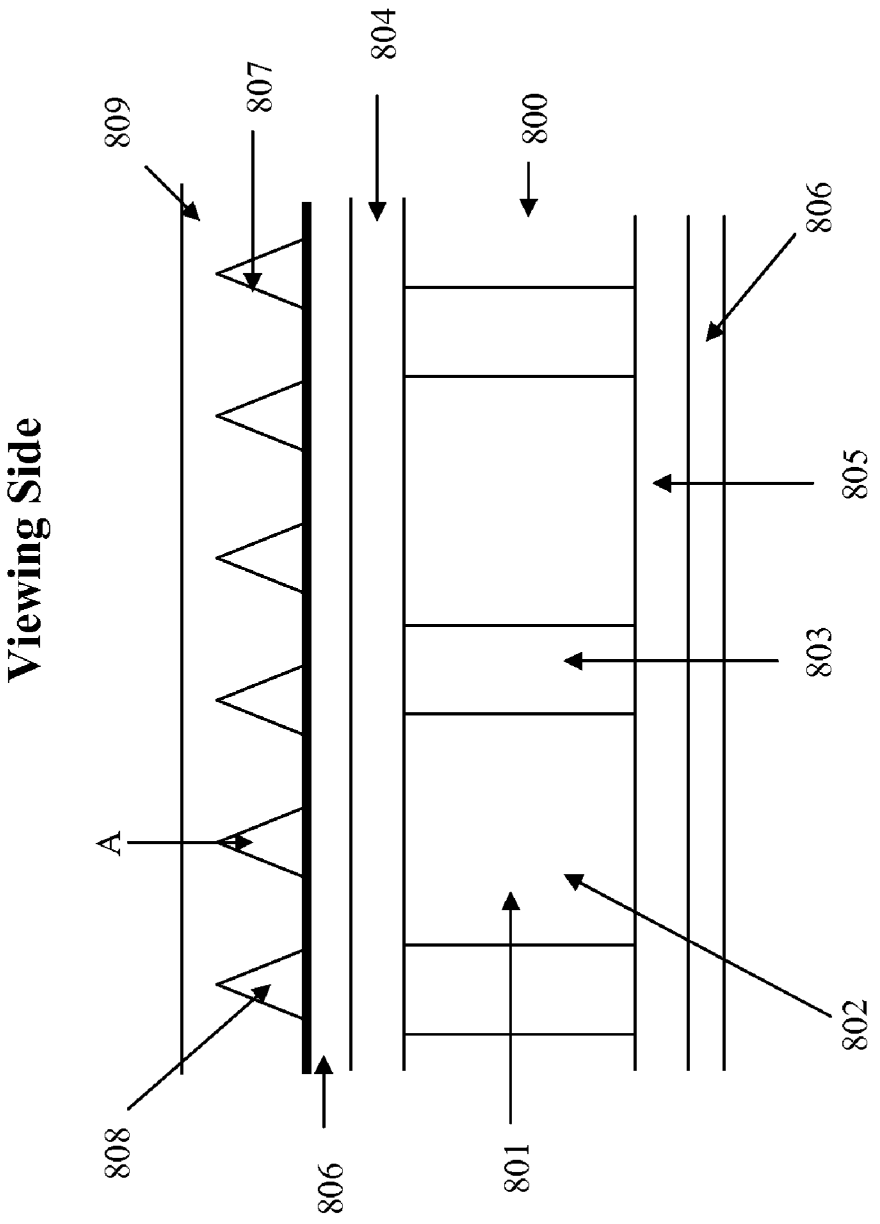
FIG. 8 illustrates a brightness enhancement structure.

FIG. 8 is a cross section view of a brightness enhancement structure (809) on the viewing side of a display device (800).

The display device comprises an array of display cells (801) filled with a display fluid (802). Each of the display cells is surrounded by partition walls (803). The array of display cells is sandwiched between two electrode layers (804 and 805). The electrode layers are usually formed on a substrate layer (806), such as polyethylene terephthalate (PET). The substrate layer may also be a glass layer.

The brightness enhancement structure (809) comprises micro-structures or micro-reflectors (808). The micro-reflectors are micro-structures the surface (807) of which is coated with a metal layer. In the context of the present invention, the term "brightness enhancement structure" encompasses a brightness enhancement comprising either micro-structures (uncoated) or micro-reflectors (coated).

Figure 9A:
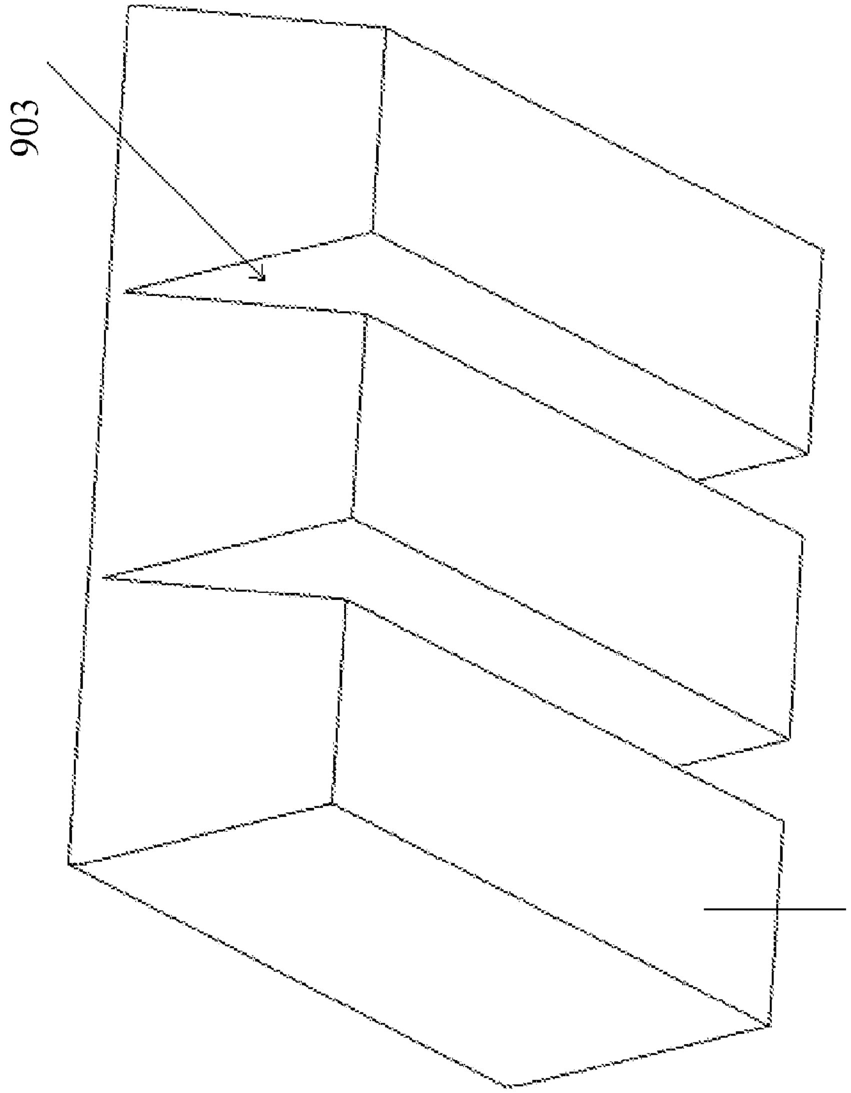
FIGS. 9*a* and 9*b* depict a three-dimensional view of two brightness enhancement structures.
Figure 9B:
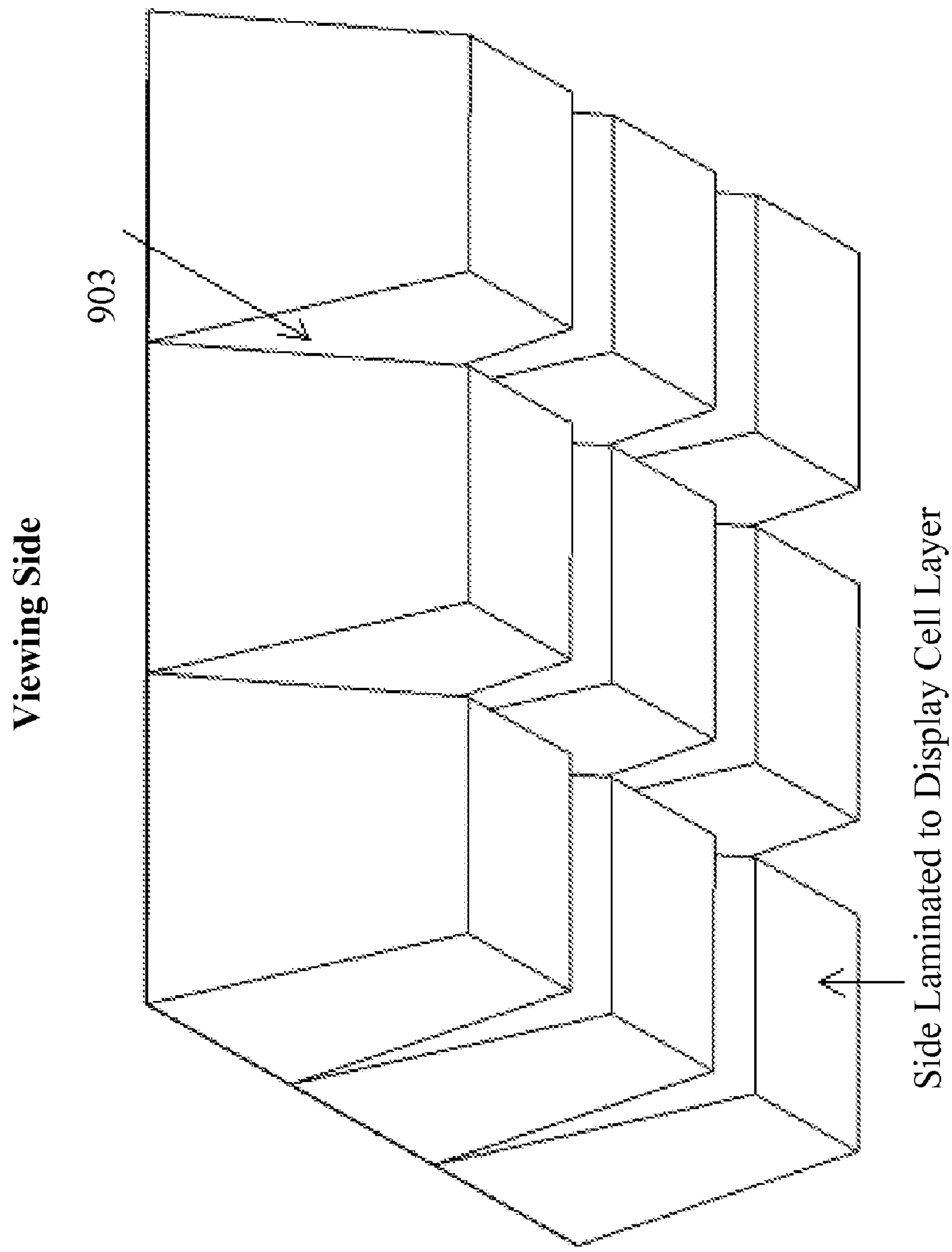

The micro-structure or micro-reflectors have a triangular cross-section as shown. In one type of the brightness enhancement structure, the micro-structures or micro-reflectors are in the form of one-dimensional grooves. FIG. 9*a* depicts a three-dimensional view of such brightness enhancement structure comprising micro-structures or micro-reflectors (903) in a one dimensional pattern. FIG. 9*b* is an alternative design in which the micro-structures or micro-reflectors (903) are discreet structures which may be aligned with the display cells underneath the brightness enhancement structure.

The space within the micro-structures or micro-reflectors usually is filled with air. It is also possible for the space to be in a vacuum state. Alternatively, the space in the micro-structures or micro-reflectors may be filled with a low refractive index material, lower than the refractive index of the material forming the brightness enhancement structure. However if the surface of the micro-structures is coated with a metal layer (i.e., micro-reflectors), the space may be filled with a material of any refractive index.

The top angle A of the micro-structures or micro-reflectors is preferably in the range of about 5° to about 50°, more preferably in the range of about 15° to about 30°.

The brightness enhancement structure may be fabricated in many different ways. The details of the brightness enhancement structure are disclosed in U.S. patent application Ser. Nos. 12/323,300, 12/323,315, 12/370,485 and 12/397,917, the contents of which are incorporated herein by reference in their entirety.

In one embodiment, the brightness enhancement structure may be fabricated separately and then laminated over the viewing side of the display device. For example, the brightness enhancement structure may be fabricated by embossing as shown in FIG. 1*a*. The embossing process is carried out at a temperature higher than the glass transition temperature of the embossable composition (1000) coated on a substrate layer (1001). The embossing is usually accomplished by a male mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated male mold or a heated housing substrate against which the mold presses may be used to control the embossing temperature and pressure. The male mold is usually formed of a metal such as nickel.

Figure 10A:
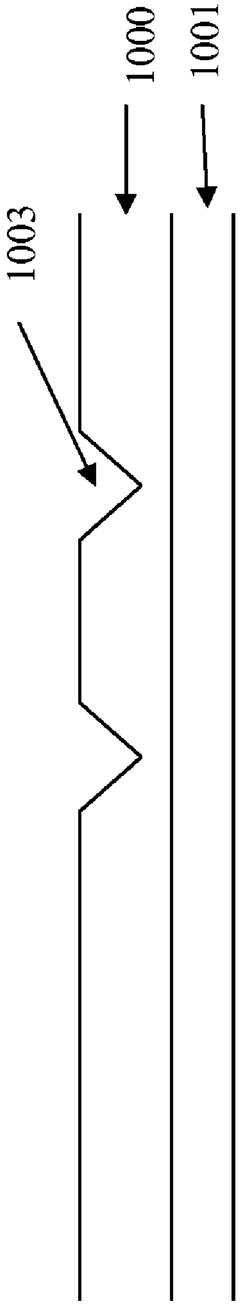
FIGS. 10*a*-10*g* illustrate an example of how a brightness enhancement structure may be fabricated.

As shown in FIG. 10*a*, the mold creates the prism-like brightness enhancement micro-structures (1003) and is released during or after the embossable composition is hardened. The hardening of the embossable composition may be accomplished by cooling, solvent evaporation, cross-linking by radiation, heat or moisture. In the context of the present invention, the cavity (1003) is called a micro-structure.

The refraction index of the material for forming the brightness enhancement structure is preferably greater than about 1.4, more preferably between about 1.5 and about 1.7.

The brightness enhancement structure may be used as is or further coated with a metal layer.

Figure 10B:
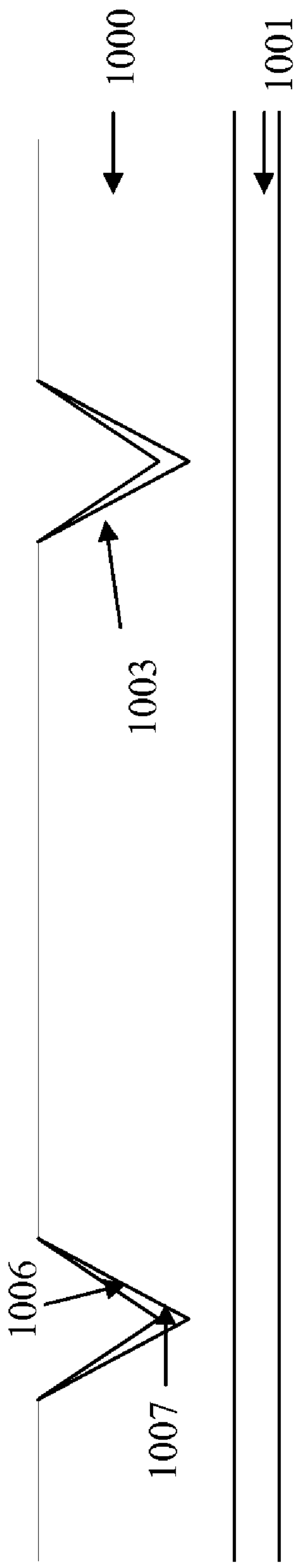

The metal layer (1007) is then deposited over the surface (1006) of the micro-structures (1003) as shown in FIG. 10*b*. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (1006) of the micro-structures, using a variety of techniques such as sputtering, evaporation, roll transfer coating, electroless plating or the like.

Figure 10C:
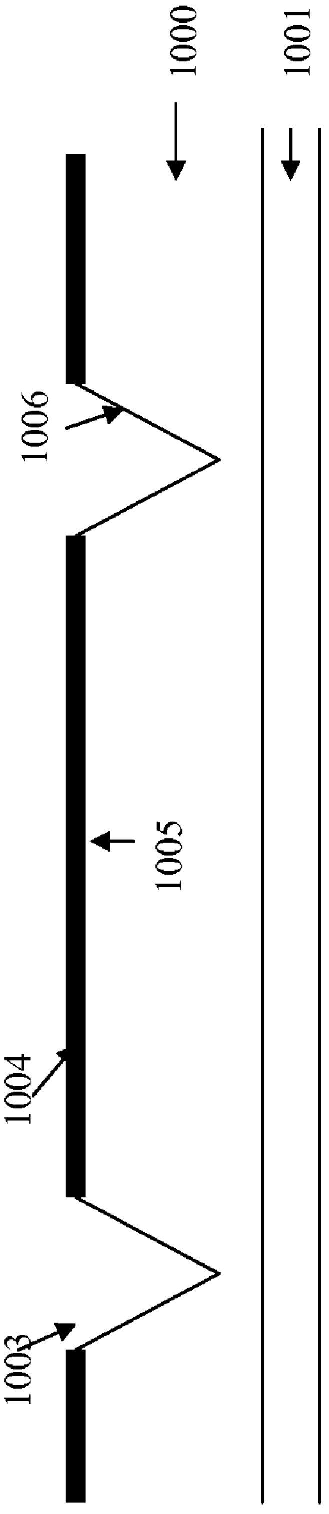

In order to facilitate formation of the metal layer only on the intended surface (i.e., the surface 1006 of the micro-structures), a strippable masking layer may be coated before metal deposition, over the surface on which the metal layer is not to be deposited. As shown in FIG. 10*c*, a strippable masking layer (1004) is coated onto the surface (1005) between the openings of the micro-structures. The strippable masking layer is not coated on the surface (1006) of the micro-structures (1003).

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2$/g, preferably in the range of about 200 to about 400 $m^2$/g. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wetability in the coated layer.

Figure 10D:
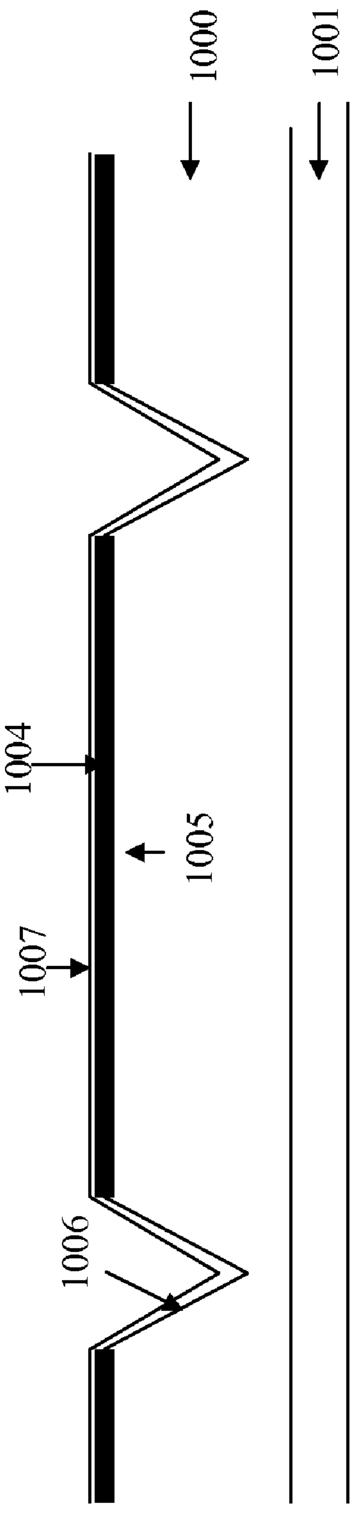

In FIG. 10*d*, a metal layer (1007) is shown to be deposited over the entire surface, including the surface (1006) of the micro-structures and the surface (1005) between the micro-structures. Suitable metal materials are those as described above. The metal material must be reflective and may be deposited by a variety of techniques previously described.

Figure 10E:
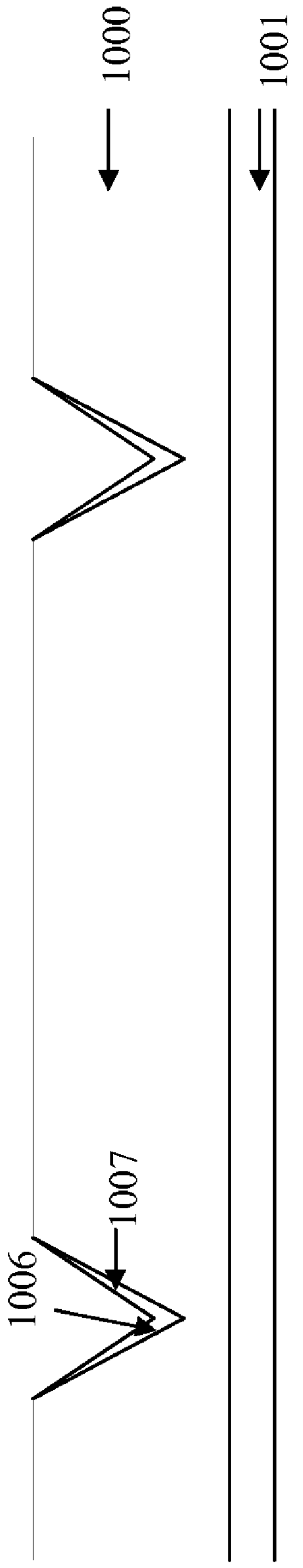

FIG. 10*e* shows the structure after removal of the strippable masking layer (1004) with the metal layer 1007 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (1004), the metal layer (1007) deposited on the strippable masking layer is also removed, leaving the metal layer (1007) only on the surface (1006) of the micro-structures.

Figure 10F:
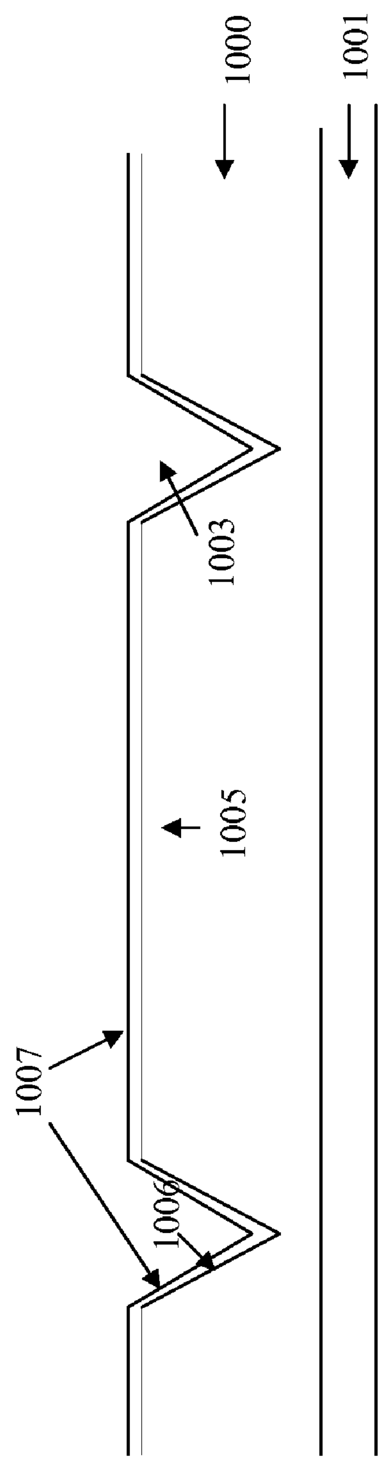
Figure 10G:
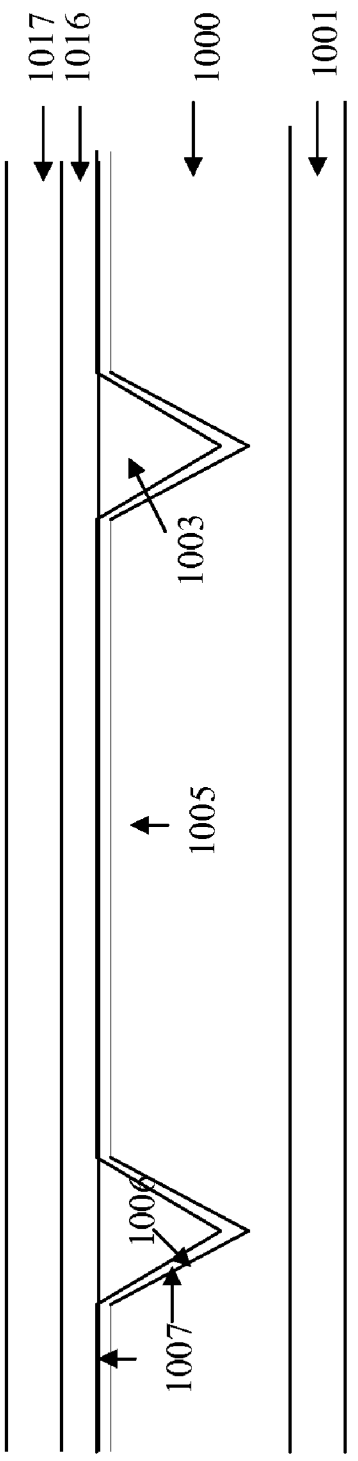

FIGS. 10*f* and 10*g* depict an alternative process for depositing the metal layer. In FIG. 10*f*, a metal layer (1007) is deposited over the entire surface first, including both the surface (1006) of the micro-structures (1003) and the surface (1005) between the micro-structures. FIG. 10*g* shows that the film of micro-structures deposited with a metal layer (1007) is laminated with a film (1017) coated with an adhesive layer (1016). The metal layer (1007) on top of the surface (1005) may be conveniently peeled off when the micro-structure film is delaminated (separated) from the adhesive layer (1016) coated film (1017). The thickness of the adhesive layer (1016) on the adhesive coated film is preferably in the range of about 1 to about 50 um and more preferably in the range of about 2 to about 10 um.

The brightness enhancement structure comprising micro-structures (uncoated with a metal layer) or micro-reflectors (coated with a metal layer) is then laminated over a layer of display cells.

In the case of the brightness enhancement structure of FIG. 9*b*, instead of laminating the brightness enhancement structure to a display device, the display device may be fabricated by a self-alignment process as disclosed in U.S. patent application Ser. Nos. 12/323,300 and 12/323,315.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising a plurality of display cells, wherein each of said display cells is
(a) sandwiched between a first layer comprising a common electrode and a second layer comprising a plurality of driving electrodes in an at least 2×2 grid, wherein at least one of the driving electrodes is a designated electrode and the remaining driving electrodes are non-designated electrodes,
(b) filled with an electrophoretic fluid comprising a group of white particles and a group of black particles dispersed in a solvent or solvent mixture, and
(c) capable of displaying three color states.

2. The display device of claim 1, wherein said solvent or solvent mixture is colored.

3. The display device of claim 2, wherein the two groups of particles carry opposite charge polarities.

4. The display device of claim 2, wherein the solvent or solvent mixture is red, green or blue.

5. The display device of claim 2, wherein the driving electrodes are not aligned with the boundary of the display cell.

6. The display device of claim 2, wherein the driving electrodes are aligned with the boundary of the display cell.

7. The display device of claim 2, wherein the pigment particles are driven by a driving method comprising driving said pigment particles from one driving electrode to an adjacent driving electrode and eventually to the designated electrode(s).

8. The display device of claim 2, wherein the total area of the non-designated electrodes is at least three times the total area of the designated electrode(s).

9. The display device of claim 2, wherein the first layer is on the viewing side.

10. The display device of claim 2, wherein the second layer is on the viewing side.

11. The display device of claim 2, further comprising a brightness enhancement structure on its viewing side, wherein said brightness enhancement structure comprises micro-structures or micro-reflectors and said micro-structures or micro-reflectors have a triangular cross-section.

12. The display device of claim 11, wherein said triangular cross-section has a top angle of about 5° to about 50°.

13. The display device of claim 1, wherein said solvent or solvent mixture is clear and colorless and the display device further comprising a colored background layer.

14. The display device of claim 13, wherein the two groups of particles carry opposite charge polarities.

15. The display device of claim 13, wherein the background layer is red, green or blue.

16. The display device of claim 13, wherein the boundary of the second layer is not aligned with the boundary of the fluid area in the display cell.

17. The display device of claim 16, wherein at least one designated electrode for the white particles and at least one designated electrode for the black particles are within the boundary of the fluid area.

18. The display device of claim 13, wherein the boundary of the second layer is aligned with the boundary of the fluid area in the display cell.

19. The display device of claim 13, wherein the pigment particles are driven by a driving method comprising driving said pigment particles from one driving electrode to an adjacent driving electrode and eventually to the designated electrode(s).

20. The display device of claim 13, further comprising a brightness enhancement structure on its viewing side, wherein said brightness enhancement structure comprises micro-structures or micro-reflectors and said micro-structures or micro-reflectors have a triangular cross-section.

21. The display device of claim 13, further comprising blocking layer in positions corresponding to the designated electrodes.

22. The display device of claim 13, wherein the designated electrodes are non-transparent and said second layer is the viewing side.

23. The display device of claim 13, wherein the total area of the non-designated electrodes is at least three times the total area of the designated electrode(s).

* * * * *